(12) United States Patent
Hirai et al.

(10) Patent No.: US 9,188,357 B2
(45) Date of Patent: Nov. 17, 2015

(54) VEHICLE AIR CONDITIONER

(75) Inventors: Shinichirou Hirai, Ichinomiya (JP); Yasuhiro Sagou, Chiryu (JP); Manabu Maeda, Nagoya (JP); Takuya Kataoka, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 930 days.

(21) Appl. No.: 13/068,739

(22) Filed: May 19, 2011

(65) Prior Publication Data

US 2011/0284202 A1 Nov. 24, 2011

(30) Foreign Application Priority Data

May 20, 2010 (JP) ................... 2010-116626
Feb. 15, 2011 (JP) ................... 2011-030003

(51) Int. Cl.
 *F24F 11/00* (2006.01)
 *B60H 1/00* (2006.01)
(52) U.S. Cl.
 CPC ........ *F24F 11/0034* (2013.01); *B60H 1/00742* (2013.01); *B60H 1/00842* (2013.01); *B60H 1/00849* (2013.01); *B60H 2001/00192* (2013.01); *F24F 2011/0035* (2013.01)
(58) Field of Classification Search
 CPC .......................... F24F 11/0035; F24F 11/0034
 USPC .............................. 165/41, 202, 203, 204, 209
 See application file for complete search history.

(56) References Cited

U.S. PATENT DOCUMENTS

| | | | | |
|---|---|---|---|---|
| 4,375,754 A | * | 3/1983 | Okura | 62/180 |
| 4,482,009 A | * | 11/1984 | Nishimura et al. | 165/203 |
| 5,361,865 A | * | 11/1994 | Lindner | 180/273 |
| 5,390,728 A | * | 2/1995 | Ban | 165/204 |
| 5,582,234 A | * | 12/1996 | Samukawa et al. | 165/204 |
| 5,725,052 A | * | 3/1998 | Kawai et al. | 165/203 |
| 5,878,809 A | * | 3/1999 | Heinle | 165/203 |
| 6,352,102 B1 | * | 3/2002 | Takechi et al. | 165/42 |

(Continued)

FOREIGN PATENT DOCUMENTS

| | | |
|---|---|---|
| JP | 61-024612 | 2/1986 |
| JP | H5-254331 | 10/1993 |

(Continued)

OTHER PUBLICATIONS

Office action dated Dec. 17, 2013 in corresponding JP Application No. 2011-030003.

*Primary Examiner* — Marc Norman
*Assistant Examiner* — Devon Russell
(74) *Attorney, Agent, or Firm* — Harness, Dickey & Pierce, P.L.C.

(57) ABSTRACT

A vehicle air conditioner includes a heating heat exchanger, a first temperature adjustment mechanism for adjusting a temperature of air to be blown toward a driver's seat side in a vehicle compartment, and a second temperature adjustment mechanism for adjusting a temperature of air to be blown toward a front-passenger's seat side in the vehicle compartment. In the vehicle air conditioner, the first and second temperature adjustment mechanisms are controlled to perform a one-seat priority mode control such that the temperature of air to be blown toward the front-passenger's seat side is lower than the temperature of air to be blown toward the driver's seat side, when only the driver is in the vehicle compartment and the heating condition is determined as the air conditioning state.

2 Claims, 18 Drawing Sheets

(56) References Cited

U.S. PATENT DOCUMENTS

| | | | |
|---|---|---|---|
| 6,386,965 B1* | 5/2002 | Greenwald et al. | 454/75 |
| 6,425,437 B2* | 7/2002 | Schmadl et al. | 165/42 |
| 6,454,178 B1* | 9/2002 | Fusco et al. | 236/49.3 |
| 6,622,928 B2* | 9/2003 | Tsunoda et al. | 236/91 C |
| 6,719,624 B2* | 4/2004 | Hayashi et al. | 454/120 |
| 7,389,812 B2* | 6/2008 | Kumada et al. | 165/203 |
| 7,900,464 B2* | 3/2011 | Aoki et al. | 62/176.6 |
| 7,918,100 B2* | 4/2011 | Breed et al. | 62/244 |
| 8,082,979 B2* | 12/2011 | Greiner et al. | 165/202 |
| 8,187,063 B2* | 5/2012 | Kanemaru et al. | 454/75 |
| 8,403,029 B2* | 3/2013 | Nanaumi et al. | 165/42 |
| 8,662,157 B2* | 3/2014 | Kitamura et al. | 165/204 |
| 8,662,158 B2* | 3/2014 | Seto et al. | 165/204 |
| 2006/0144581 A1* | 7/2006 | Kauf | 165/202 |
| 2010/0163220 A1* | 7/2010 | Nakajima | 165/202 |

FOREIGN PATENT DOCUMENTS

| | | |
|---|---|---|
| JP | 06-032139 | 2/1994 |
| JP | 06-234318 | 8/1994 |
| JP | 10-119545 | 5/1998 |
| JP | 11-189024 | 7/1999 |
| JP | 2001-315520 | 11/2001 |
| JP | 2003-136952 | 5/2003 |
| JP | 2008-222133 | 9/2008 |
| JP | 2008-296717 | 12/2008 |

* cited by examiner

VEHICLE AIR CONDITIONER

CROSS REFERENCE TO RELATED APPLICATION

This application is based on Japanese Patent Applications No. 2010-116626 filed on May 20, 2010, and No. 2011-030003 filed on Feb. 15, 2011, the contents of which are incorporated herein by reference in its entirety.

TECHNICAL FIELD

The present invention relates to a vehicle air conditioner in which temperature of air to be blown into a vehicle compartment can be independently adjusted on left and right sides, and air conditioning can be performed preferentially for a driver's seat side in accordance with an occupant's state in the vehicle compartment.

BACKGROUND

In a hybrid vehicle which is driven and running by combining an engine and an electrical motor, an engine load in a heating operation is decreased in accordance with increase of an engine efficiency. For example, even in the heating operation in the winter, it is required to reduce the engine load in order to improve the fuel consumption efficiency, and thereby the heat quantity in the heating operation is reduced.

In the recent years, because of the high efficiency of the engine, it is difficult to obtain a sufficient heating source for performing the heating operation. In this situation, Patent Document 1 (JP Patent No. 2960243) describes regarding a vehicle air conditioner.

If conditioned air is blown to predetermined plural positions in a vehicle compartment regardless of an occupant number and an occupant state in the vehicle compartment, conditioned air may be blown to positions without having the occupant, and thereby it is difficult to perform promptly cooling or heating operation of the vehicle compartment. In the vehicle air conditioner described in Patent Document 1, an occupant-seated state in the vehicle compartment is detected, so that cooling or heating capacity is determined based on the occupant-seated state, and the air state to be blown into the vehicle compartment is controlled.

In Patent Document 1, a detail movement of an occupant, such as occupant's cardiac beats and breathings, is detected by an occupant detection means, thereby controlling the cooling or heating capacity and the air state to be blown into the vehicle compartment in accordance with a signal from the occupant detection means. In the present specification, the occupant includes the driver seated on the driver's seat, a passenger seated on the front-passenger's seat next to the driver's seat, or any passenger seated on the rear seat in the vehicle compartment.

More specifically, the occupant detection means detects presence or absence of an occupant based on occupant's cardiac beats and breathings. When the occupant's presence is detected, the cooling or heating capacity is determined in accordance with an occupant's number, and cooling or heating operation is performed by blowing conditioned air to only the occupant's presence position. When only the driver is in the vehicle compartment, that is, when the occupant's number is 1, conditioned air is blown to be concentrated to the one position of the driver in the vehicle compartment.

Patent Document 2 (JP 2008-296717A) describes regarding a vehicle air conditioner. In the vehicle air conditioner of Patent Document 2, when a control means determines that the occupant is only the driver based on a detection result of a seat detection means, a driver-seat concentrating mode is set so that the temperature of the driver's seat space is rapidly adjusted. Among the plural air outlets, air outlets other than for the driver's seat space are closed by an air outlet switching means, so that the temperature of the driver's seat space of the vehicle compartment is controlled to effectively approach to a set temperature. In the vehicle air conditioner of Patent Document 2, because the conditioned air can be blown to the driver's seat space in a concentrated manner, the driver's seat space of the vehicle compartment can effectively approach to the set temperature.

In a vehicle air conditioner of Patent Document 3 (JP Patent No. 3573682), air conditioning is independently performed for a first zone of a driver's seat side and for a second zone of a front-passenger's seat side in a vehicle compartment. When operation mode is manually changed from an air blowing mode to another mode in one of the first zone of the driver's seat side and the second zone of the front-passenger's seat side so as to change an air flow resistance, the total air flow resistance is changed. Thus, the air amount blown to the other one of the first zone of the driver's seat side and the second zone of the front-passenger's seat side may be changed.

In the vehicle air conditioner of Patent Document 3, an air-amount correction calculation portion is provided to correct an operation of a fan motor based on an air flow resistance, such that even when one of the air outlet modes of the first and second zones is changed manually in an automatic control, the other one of the air outlet modes of the first and second zones is not changed. That is, the vehicle air conditioner is independently controlled such that, even when the air amount blown to the first zone is changed, the air amount blown to the second zone is not changed.

However, in the vehicle air conditioners described above, it is difficult to effectively perform a one-seat priority mode control with a simple structure while fuel consumption efficiency can be improved in the vehicle.

SUMMARY

In view of the foregoing problems, it is an object of the present invention to provide an air conditioner for a vehicle, which can effectively perform a one-seat priority mode control for the driver's seat side while reducing a consumed power.

It is another object of the present invention to effectively and preferentially perform a one-seat priority mode control in a heating operation even when an air outlet switching mechanism is not provided.

It is another object of the present invention to effectively perform a one-seat priority mode control for a driver's seat side of the vehicle compartment in a heating operation.

According to an aspect of the present invention, an air conditioner for a vehicle is provided with an air conditioning unit that includes a heating heat exchanger configured to heat air to be blown into a vehicle compartment, a first temperature adjustment mechanism configured to adjust a temperature of air to be blown toward a driver's seat side in the vehicle compartment, and a second temperature adjustment mechanism configured to adjust a temperature of air to be blown toward a front-passenger's seat side in the vehicle compartment. Furthermore, the air conditioner is provided with an occupant determining means for determining whether only a driver is on a driver seat as an occupant in the vehicle compartment, an air-conditioning state determining means for determining whether an air conditioning state on the driver's seat side is a heating condition, and a control means for controlling the air conditioning unit including the first and second temperature adjustment mechanisms to perform a one-seat priority mode control such that the temperature of air to be blown toward the front-passenger's seat side is lower than the temperature of air to be blown toward the driver's seat side, when the determining means determines that only the driver is in the vehicle compartment and the heating condition is determined as the air conditioning state.

Thus, even when the air conditioner is not provided with a shutting means for shutting air outlets other than a driver-seat air outlet, it is possible to perform the one-seat priority mode control for the driver's seat side, thereby effectively reducing consumed power in the heating operation.

For example, the first temperature adjustment mechanism may be a first temperature adjustment door configured to adjust a ratio between an air amount passing through the heating heat exchanger and an air amount bypassing the heating heat exchanger on the driver's seat side, and the second temperature adjustment mechanism may be a second temperature adjustment door configured to adjust a ratio between an air amount passing through the heating heat exchanger and an air amount bypassing the heating heat exchanger on the front-passenger's seat side.

Furthermore, the air conditioning unit may be an inside/outside air separable unit with an inside/outside air two-layer mode in which outside air flows toward an upper side of the vehicle compartment and inside air flows toward a lower side of the vehicle compartment. In this case, the inside/outside air separable unit is configured such that only the outside air flows toward the upper side of the vehicle compartment in an outside air introduction mode in which only outside air is introduced into the air conditioning unit, and the inside/outside air separable unit is configured such that only the inside air flows toward the lower side of the vehicle compartment in an inside air introduction mode in which only inside air is introduced into the air conditioning unit.

The air conditioning unit may further include a first face air outlet from which conditioned air is blown toward an upper side of the driver's seat in the vehicle compartment, a second face air outlet from which conditioned air is blown toward an upper side of the front-passenger's seat in the vehicle compartment, and a defroster air outlet from which conditioned air is blown toward an inner surface of a windshield of the vehicle, an air outlet switching mechanism configured to open and close at least the second face air outlet and the defroster air outlet. In this case, the air outlet switching mechanism may adjust opening or closing of the second face air outlet and the defroster air outlet in accordance with the determined window clouding state while the temperature of air to be blown toward the front-passenger's seat side is made lower than the temperature of air to be blown toward the driver's seat side, when the determining means determines that only the driver is in the vehicle compartment and the heating condition is determined as the air conditioning state.

The air conditioning unit may further include a foot air outlet from which conditioned air is blown toward a foot area of a passenger of the vehicle compartment, and a knee air outlet from which conditioned air is blown toward the knee portion of the driver seated on the driver's seat. In this case, the control means causes conditioned air to be blown from the knee air outlet toward the knee portion of the driver, and controls the first and second temperature adjustment mechanisms such that the temperature of air to be blown toward the front-passenger's seat side is lower than the temperature of air to be blown toward the driver's seat side, when the determining means determines that only the driver is in the vehicle compartment and the heating condition is determined as the air conditioning state.

The air conditioner may further include a seat air-conditioning unit configured to heat the front-passenger's seat, a first setting portion configured to set a heating target value on the driver's seat side, and a second setting portion configured to set a heating target value on the front-passenger's seat side. In this case, when the determining means determines that only the driver is in the vehicle compartment and the heating condition is determined as the air conditioning state, the control means may control the first and second temperature adjustment mechanisms such that the temperature of air to be blown toward the front-passenger's seat side is lower than the temperature of air to be blown toward the driver's seat side, and the second setting portion may set the heating target value lower in a case where the seat air-conditioning unit is operated as compared with a case where the seat air-conditioning unit is not operated.

The heating heat exchanger may include a first heating heat-exchanging portion for heating the driver's seat side in the vehicle compartment, and a second heating heat-exchanging portion for heating the front-passenger's seat side in the vehicle compartment. In this case, the first and second temperature adjustment mechanisms may be respectively a first flow adjustment portion configured to adjust a flow amount of hot water flowing through the first heating heat-exchanging portion and a second flow adjustment portion configured to adjust a flow amount of hot water flowing through the second heating heat-exchanging portion. Furthermore, the control means may control the first and second flow adjustment portions such that the temperature of air to be blown toward the front-passenger's seat side is lower than the temperature of air to be blown toward the driver's seat side, when the determining means determines that only the driver is in the vehicle compartment and the air conditioning sate is the heating condition.

Furthermore, the air conditioning unit may be provided with a foot air outlet from which conditioned air is blown toward a lower side in the vehicle compartment, and a face air outlet from which conditioned air is blown toward an upper side in the vehicle compartment. In this case, the determining means may determine that the air conditioning state is the heating condition, when an air outlet mode is any one of a foot mode in which conditioned air is blown from the foot air outlet toward the lower side of the vehicle compartment, and a bi-level mode in which conditioned air is blown from both of the face air outlet and the foot air outlet.

Alternatively, the control means may control the second temperature adjustment mechanism such that the temperature of air blown toward the front-passenger's seat side in the vehicle compartment becomes higher as the temperature of the outside air becomes lower. Alternatively, the control means may control the first and second temperature adjustment mechanisms based on the calculated target temperature, such that a temperature difference between air to be blown toward the driver's seat side and air to be blown toward the front-passenger's seat side is enlarged as the calculated target temperature becomes lower, when the determining means determines that only the driver is in the vehicle compartment and the air conditioning state is the heating condition.

The control means may include means for correcting the temperature of air to be blown toward the front-passenger's seat side in the vehicle compartment based on at least one of a vehicle speed and a solar radiation amount entering the vehicle compartment. In this case, the correction means causes the temperature of air blown toward the front-passenger's seat side to become higher as the vehicle speed becomes higher, and causes the temperature of air blown toward the driver's seat side to become lower as the solar radiation amount entering into the vehicle compartment becomes larger.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF THE PREFERRED EMBODIMENTS

Figure 1:
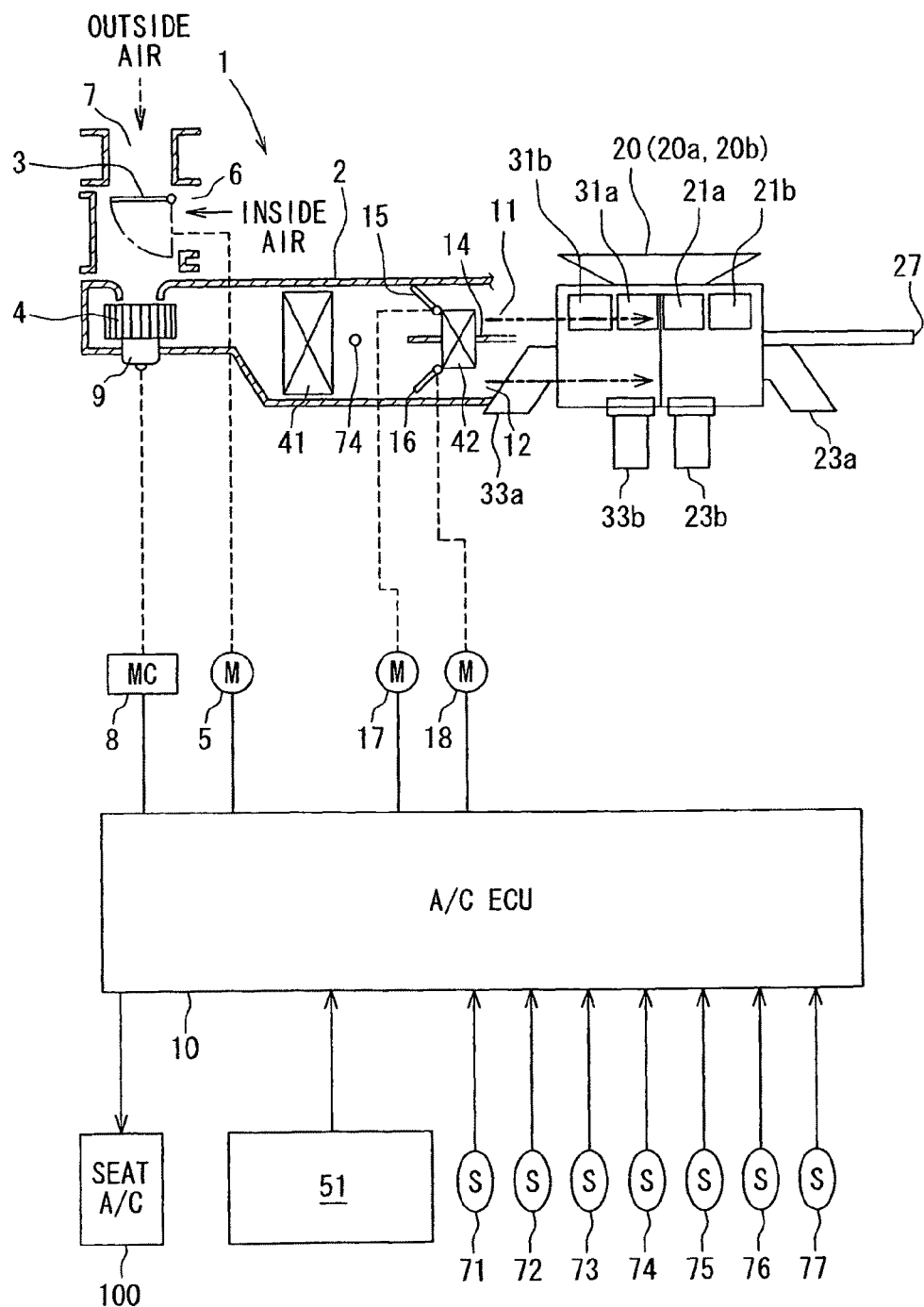
FIG. 1 is a schematic diagram showing an entire structure of a vehicle air conditioning system according to a first embodiment of the present invention.

Embodiments and modified examples of the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
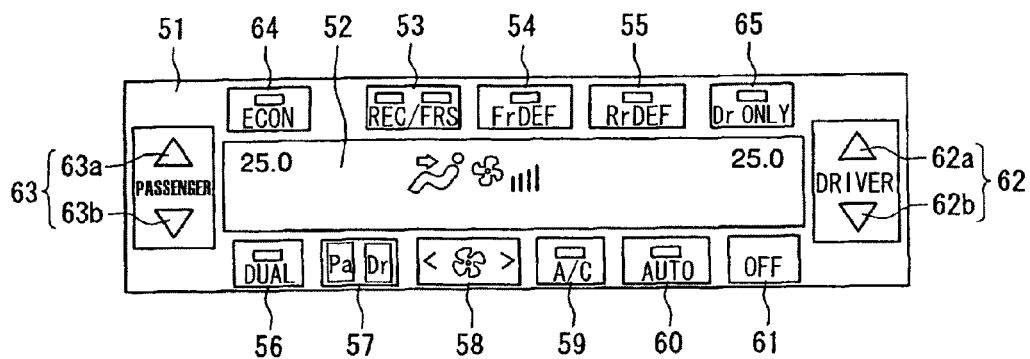
FIG. 2 is a front view showing an instrument panel of the first embodiment.

A first embodiment of the present invention will be described hereafter with reference to FIGS. 1 to 7. FIG. 1 is a schematic diagram showing an entire structure of a vehicle air conditioner according to a first embodiment of the present invention, and FIG. 2 is a front view showing an instrument panel of the first embodiment.

The vehicle air conditioner of the present embodiment is an automatic air conditioning system, in which actuators and the like of an air conditioning unit 1 is controlled by an air conditioning ECU (controller) 10 in a vehicle having a water-cooled engine, for example.

The air conditioning unit 1 is configured to independently perform temperature adjustments between a driver's seat side and a front-passenger's seat side in a vehicle compartment. For example, the driver's seat side is one of left and right side spaces, including a driver's seat space and a rear seat space of the driver's seat in the vehicle compartment, and the front-passenger's seat side is the other one of the left and right side spaces, including a front-passenger's seat space and a rear seat space of the front-passenger's seat in the vehicle compartment. The air conditioning unit 1 includes an air conditioning duct 2 arranged at the front side in the vehicle compartment. The air conditioning duct 2 defines an air passage through which air flows into the vehicle compartment.

A blower unit is disposed at an upstream air side of the air conditioning duct 2 to include an inside/outside air switching portion and a blower 4. The inside/outside air switching portion includes an inside/outside air switching door 3, which is driven by an actuator such as a servomotor 5 to change open degrees of an inside air suction port 6 and an outside air suction mode 7.

The air conditioning unit 1 is a center arrangement type, and is mounted at a lower side of an instrument panel on the vehicle front side at a center portion in a vehicle left-right direction. The blower unit is arranged at a vehicle front side with respect to the body portion of the air conditioning unit 1. The inside air suction port 6 of the blower unit is open to a lower side of a driver's seat side, so that inside air (i.e., air inside the vehicle compartment) is drawn into the inside air suction port 6 from the driver's seat side.

The blower 4 is a centrifugal blower driven and rotated by a blower motor 9 that is controlled by a blower drive circuit 8. The blower 4 is adapted to generate an air flow toward the vehicle compartment in the air conditioning duct 2. The blower 4 is adapted as an air flow amount changing means or an air flow speed changing means for changing an air flow amount or an air flow speed of conditioned air to be blown to the driver's seat space and the front-passenger's seat space in the vehicle compartment.

A cooling heat exchanger (e.g., evaporator) 41 is located in the air conditioning duct 2 to cool air passing through the air conditioning duct 2. A heating heat exchanger (e.g., heater core) 42 is disposed in the air conditioning duct 2 at a downstream air side of the cooling heat exchanger 41 to heat air after being passed through the cooling heat exchanger 42.

First and second air passages 11, 12 partitioned by a partition plate 14 are provided at a downstream air side of the cooling heat exchanger 41 in the air conditioning duct 2. The heating heat exchanger 42 is disposed to across both the first and second air passages 11, 12 so as to heat air in the first and second air passages 11, 12. If the vehicle air conditioner is used for an electrical vehicle running by an electrical power, a Peltier device may be used as the cooling heat exchanger 41 or the heating heat exchanger 42.

Driver's seat and front-passenger's seat temperature adjustment doors 15, 16 are disposed at an upstream air side of the heating heat exchanger 42, so as to independently perform the temperature adjustment of the driver's seat space and the temperature adjustment of the front-passenger's seat space. In the present embodiment, the temperature adjustment doors 15, 16 (air mixing door) are adapted as an air temperature adjustment mechanism.

More specifically, the temperature adjustment doors 15, 16 are driven by actuators such as servomotors 17, 18, and are respectively adapted as the driver's seat temperature adjustment mechanism and the front-passenger's seat temperature adjustment mechanism, thereby respectively and independently adjusting the temperature of air blown to the driver's seat space and the temperature of air blown to the front-passenger's seat space in the vehicle compartment.

The cooling heat exchanger 41 of the present embodiment is a part of a refrigerant cycle. The refrigerant cycle includes a compressor adapted to compress and discharge refrigerant, a condenser adapted to cool and condense the refrigerant discharged by the compressor, a receiver adapted to separate the refrigerant flowing from the condenser into gas refrigerant and liquid refrigerant, an expansion valve adapted to decompress and expand the liquid refrigerant flowing from the receiver, and the cooling heat exchanger 41 for evaporating the refrigerant flowing from the expansion valve. The compressor may be driven by an output shaft of the engine for the vehicle running, for example.

The compressor is a variable displacement compressor in which a discharge capacity of the refrigerant discharged from the compressor is changed by a control current output from the air conditioning ECU 10. In the present embodiment, the variable displacement compressor includes an electromagnetic control valve for performing a capacity changing control based on a control signal output in accordance with a difference between an air temperature Te detected by a temperature sensor 74 and a target temperature TEO of air to be cooled by the cooling heat exchanger 41. The air temperature Te corresponds to the temperature of air immediately after passing through the cooling heat exchanger 41.

As shown in FIG. 1, a defroster air outlet 20, driver's seat face air outlets 21a, 21b, a driver's seat foot air outlet 23a and a rear foot air outlet 23b on a driver's seat side are provided to communicate with a downstream air side of the first air passage 11 via respective air ducts.

Furthermore, as shown in FIG. 1, front-passenger's seat face air outlets 31a, 31b, a front-passenger's seat foot air outlet 33a and a rear foot air outlet 33b on the front-passenger's seat side are provided to communicate with a downstream air side of the second air passage 12 via respective air ducts. The defroster air outlet 20 is partitioned into a driver's seat defroster air outlet 20a and a front-passenger's seat defroster air outlet 20b.

In addition, a driver's seat knee air outlet 27 is provided to blow air toward the knees of the driver, in addition to the driver's seat foot air outlet 23a. FIG. 1 schematically shows the arrangement of the air outlets. The driver's seat knee air outlet 27 is provided to prevent cool air from flowing to the driver's seat side from the other seats, thereby preventing unpleasant feeling from being given to the driver.

The defroster air outlet 20 is configured such that conditioned air (e.g., warm air) is blown toward the windshield of the vehicle via the defroster air outlet 20. The face air outlets 21a, 21b, 31a, 31b are configured such that conditioned air (e.g., cool air) is blown toward the upper sides of the driver and the front passenger via the face air outlets 21a, 21b, 31a, 31b. The foot air outlets 23a, 33a are configured such that conditioned air (e.g., warm air) is blown toward the lower sides of the driver and the front passenger via the foot air outlets 23a, 33a.

In the present embodiment, air outlet mode switching doors for independently setting a driver's seat air outlet mode and a front-passenger's seat air outlet mode and for opening and closing the air outlets are not provided, and a door mechanism for linking the air outlet switching doors is not provided.

That is, the air outlet mode switching doors for setting air outlet modes such as a face mode, a bi-level mode, a foot mode, a foot/defroster mode and a defroster mode are omitted, in the present embodiment. Thus, the air outlet door structure can be made simple, and the cost of the vehicle air conditioner can be reduced. In the present embodiment, when the vehicle air conditioner is operated, conditioned air is blown from all the air outlets 20, 21a, 21b, 27, 23a, 23b, 33a, 33b, based on the air flow resistances.

A seat air conditioning unit 100 is configured to heat the driver's seat and the front-passenger's seat next to the driver's seat, by using a PCT heater, for example.

The air conditioning ECU 10 is configured to start a calculation process or a control process, when an ignition switch is turned on and electrical power is supplied from a battery mounted in the vehicle to a current electrical source. The ignition switch is adapted to start or stop the operation of the engine.

As shown in FIG. 1 and FIG. 2, switch signals of various control switches provided on an air-conditioning operation panel 51 in the instrument panel are input to the air conditioning ECU 10.

As shown in FIG. 2, the air-conditioning operation panel 51 is provided with a liquid crystal display (display device) 52, an inside/outside air selecting switch 53, a front defroster switch 54, a rear defroster switch 55, a dual switch 56, an air-blowing amount selecting switch 58, an air conditioning switch 59, an automatic switch 60, an air-conditioning off switch 61, driver's seat and front-passenger's seat temperature setting units 62, 63, a fuel-consumption improving switch 64 (economy switch) and a one-seat priority mode switch 65. Furthermore, a seat operation switch 57 is provided in the air-conditioning operation panel 51 to respectively operate air-conditioning on the driver's seat side and the front-passenger's seat side.

The liquid crystal display 52 is provided with set-temperature display portions on the driver's seat side and the front-passenger's seat side to display a set temperature on the driver's seat side and a set temperature on the front-passenger's seat side, an air amount display portion to indicate the air blowing amount, and the like. The liquid crystal display 52 may be provided with an outside air display portion, an air introduction mode display portion, a time display portion and the like. In addition, the air conditioning operation panel 51 may be further provided with a touch switch in the liquid crystal display 52.

The front defroster switch 54 is an air conditioning switch that instructs whether or not a defrosting capacity of the windshield is increased. Thus, the front defroster switch 54 is a defroster-mode requesting means for requesting to the air conditioning ECU 10 to set a defroster mode as an air outlet mode. The duel switch 56 is left and right independent control means for independently controlling the left and right independent temperature controls so as to independently perform the temperature adjustment on the right-seat space (e.g., driver's seat space) and the temperature adjustment on the left-seat space (e.g., front-passenger's seat space).

The air conditioning switch 59 is an air-conditioning control switch which instructs operation or stop of the compressor of the refrigerant cycle. Generally, the air conditioning switch 59 makes a compressor un-working or reduces the engine rotation load, thereby increasing the fuel consumption efficiency.

The temperature setting switches 62, 63 are adapted to respectively set temperatures of the driver's seat space and the front-passenger's seat space at desired set temperatures (Tset). The temperature setting switches 62, 63 has temperature-up switches 62a, 63a and temperature-down switches 62b, 63b, as shown in FIG. 2.

The fuel consumption improving switch 64 is an economy switch for performing air conditioning control economically in consideration with a low fuel consumption and a power saving. The one-seat priority mode switch 65 is a one-seat priority control requesting means for informing to the air conditioning ECU 10 that only the driver is in the vehicle compartment.

In addition, the air conditioning ECU 10 includes a generally known microcomputer having functions such as CPU (central processing unit), which perform computing processing and control processing, memories such as ROM, RAM, etc., and an I/O port (an input/output circuit). After the A/D conversion of the sensor signals from various sensors is carried out by the I/O port or an A/D conversion circuit, the signals are inputted into the microcomputer.

Specifically, an inside air temperature sensor 71 as an interior temperature detection portion is provided to detect an inside air temperature (interior temperature of the vehicle compartment) Tr, an outside air temperature sensor 72 as an exterior temperature detection portion is provided to detect the temperature outside the vehicle compartment (outside air temperature), and a solar radiation sensor 73 as a solar radiation detection portion are provided to detect a solar radiation amount entering the vehicle compartment. The inside air temperature sensor 71, the outside air temperature sensor 72 and the solar radiation sensor 73 are connected to the input side of the air-conditioning ECU 10.

Furthermore, a cooling temperature sensor 74, a coolant temperature sensor 75, a humidity detection sensor 76, a seat sensor 77 and the like are connected to the input side of the air conditioning ECU 10. For example, the temperature sensor 74 is disposed to detect an air temperature Te immediately after passing through the cooling heat exchanger 41, the coolant temperature sensor 75 is disposed to detect the engine coolant temperature Tw of the vehicle, the humidity detection sensor 76 is disposed to detect a relative humidity in the vehicle compartment, and the seat sensor 77 is disposed to detect whether an occupant exists on respective seats.

Each of the inside air temperature sensor 71, the outside air temperature sensor 72, the cooling temperature sensor 74 and the coolant temperature sensor 75 are configured by using a thermal sensing element such as a thermostat, for example. The solar radiation sensor 73 is configured to have a driver's seat solar radiation detection means for detecting a solar radiation amount (solar radiation strength) entering the driver's seat space, and a front-passenger's seat solar radiation detection means for detecting a solar radiation amount (solar radiation strength) entering the front-passenger's seat space in the vehicle compartment. For example, the solar radiation sensor 73 is made by using photodiode.

Figure 3:
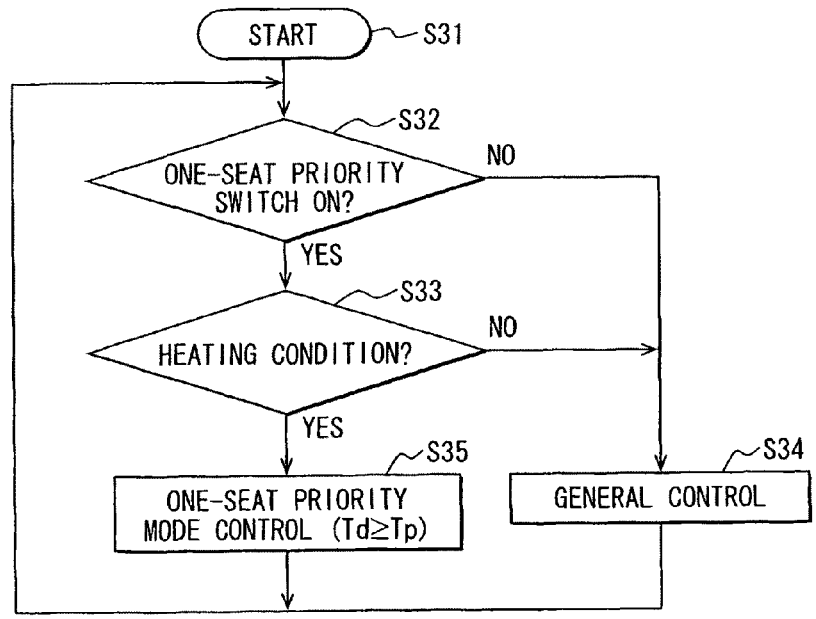
FIG. 3 is a flow diagram showing a control example of an air conditioning ECU according to the first embodiment.

A control operation of the air conditioning ECU 10 will be described. FIG. 3 is a flow diagram showing a control example of the air conditioning ECU 10 according to the first embodiment. In FIG. 3, when the control of step S31 starts, it is determined whether the one-seat priority switch 65 of FIG. 2 is turned ON at step S32 (control portion A). When the one-seat priority switch 65 is not turned ON, a general control is performed at step S34 (control portion D). In contrast, when the one-seat priority switch 65 is turned on, it is determined whether a heating condition is satisfied at step S33 (control portion B).

It is determined that the heating condition is satisfied, when the outside air temperature is lower than a first predetermined temperature (e.g., 20° C.) and when a target air temperature (TAO) blown into the vehicle compartment is higher than a second predetermined temperature (e.g., 25° C.).

In the present embodiment, because the air outlet mode switching door is not provided, the heating condition is determined to be satisfied, when both a first condition where the outside air temperature is lower than the first predetermined temperature (e.g., 20° C.) and a second condition where a target air temperature (TAO) to be blown into the vehicle compartment is higher than a second predetermined temperature (e.g., 25° C.) are satisfied. However, in a case where a vehicle air conditioner is configured to switch an air outlet mode at least on the driver's seat side, the heating condition may be determined to be satisfied when the air outlet mode is a foot mode or a bi-level mode at a time before the one-seat priority switch is turned on, in addition to both the first and second conditions.

When it is determined that the heating condition is not satisfied at step S33, the general control is performed at step S34 (control portion D). In contrast, when it is determined that the heating condition is satisfied at step S33 (control portion C), a one-seat priority mode control is performed at step S35 (control C) such that an air temperature Td to be blown toward the driver's seat space becomes equal to or higher than an air temperature Tp to be blown toward the front-passenger's seat space (Td≥Tp), by using the temperature adjustment doors 15, 16.

Figure 5:
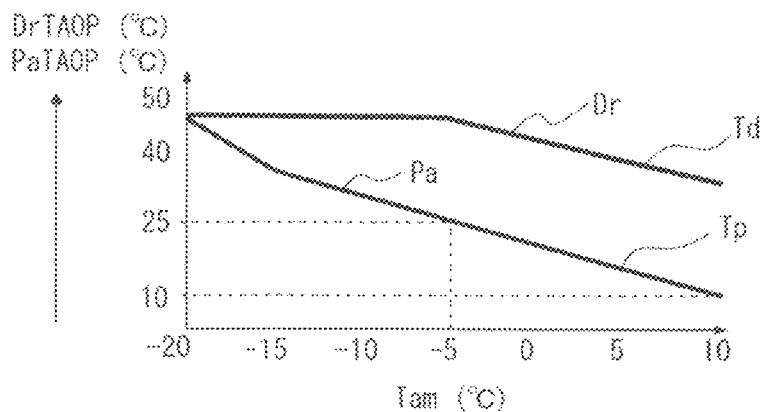
FIG. 5 is a control map adapted to a one-seat priority mode control of the air conditioning ECU according to the first embodiment.

In the one-seat priority mode control, the temperature adjustment door 15 is adjusted so that the air temperature to be blown to the driver's seat space in the vehicle compartment is approached to a calculated target air temperature TAO. In contrast, the temperature adjustment door 16 is adjusted to reduce or shut the flow amount of air passing through the heating heat exchanger 42 in the second air passage 12, thereby controlling the air temperature to be blown to the front-passenger's seat space in accordance with air conditioning load. For example, in a case where the outside air temperature is −5° C., the temperature adjustment doors 15, 16 are controlled, such that the air temperature Td on the driver's seat side due to the target air temperature TAO is about 50° C., and the air temperature Tp on the front-passenger's seat side becomes 25° C., as shown in FIG. 5.

In a case where the outside air temperature is high, the cool air on the front-passenger's seat side is hardly affected to the driver's seat side. Thus, in this case, the temperature adjustment door 16 on the front-passenger's seat side is shifted to a cool side, so that low-temperature air can be blown toward the front-passenger's seat side in the vehicle compartment. Conversely, in a case where the outside air temperature is low, the cool air on the front-passenger's seat side is easily affected to the driver's seat side. Thus, in this case, the temperature adjustment door 16 on the front-passenger's seat side is controlled, so that the temperature of air to be blown toward the front-passenger's seat side is approached to the temperature of air to be blown toward the driver's seat side in the vehicle compartment.

Figure 4:
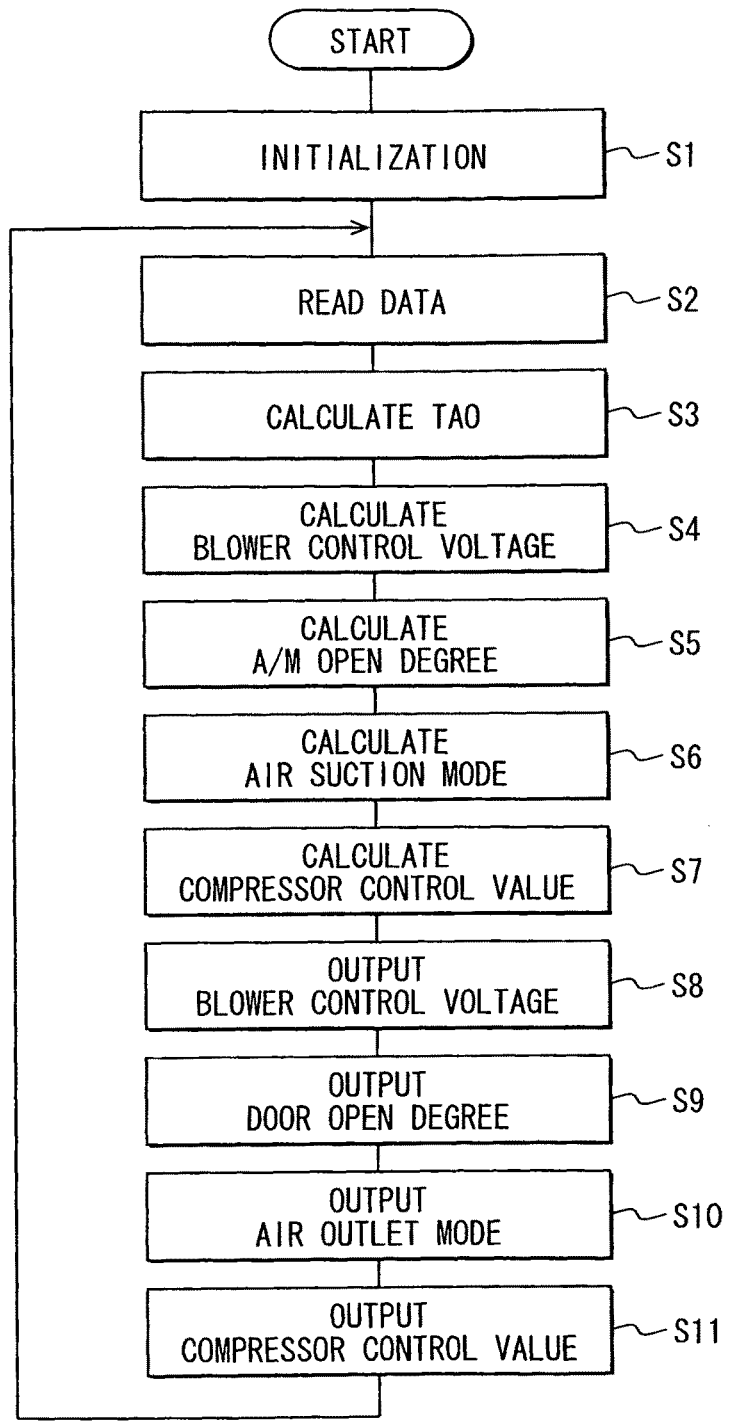
FIG. 4 is a flow diagram showing an example of a control program of the air conditioning ECU according to the first embodiment.

Next, the general control (control portion D) at step S34 of FIG. 3 will be described based on FIG. 4. FIG. 4 is a flow diagram showing an example of the general control of the air conditioning ECU 10 according to the first embodiment; When the ignition switch is turned on and direct electrical current is supplied to the air conditioning ECU 10, the control program stored in the memory is started as shown in FIG. 4.
(Step S1)

First, the memory contents for data processing in the microcomputer of the air conditioning ECU 10 are initialized.
(Step S2)

Next, various data is read into the memory for data processing. For example, the switch signals from the various operation switches on the air conditioning operation panel 51 of FIG. 1 and FIG. 2 and the sensor signals from the various sensors are inputted into the air conditioning ECU 10. Specifically, the sensor signals include an inside air temperature Tr detected by the inside air temperature sensor 71, an outside air temperature Tam detected by an outside air temperature sensor 72, a solar radiation amount Ts detected by the solar radiation sensor 73, an air temperature Te detected by the cooling temperature sensor 74, and a coolant temperature detected by the coolant temperature sensor 75.
(Step S3)

Then, a driver's seat target air temperature DrTAO and a front-passenger's seat target air temperature PaTAO are respectively calculated based on the following formula (1), and then a target cooling temperature TEO of air immediately after passing through the cooling heat exchanger 41 is calculated based on the driver's seat target air temperature DrTAO, the front-passenger's seat target air temperature PaTAO and the outside air temperature Tam.

The target air temperatures DrTAO, PaTAO on the driver's seat side and the front-passenger's seat side are calculated based on the following formula (1) stored in the ROM. DrTAO indicates the target air temperature on the driver's seat side (Dr), and PaTAO indicates the target air temperature on the front-passenger's seat side (Pr).

$$TAO = Kset \times Tset - Kr \times Tr - Kam \times Tam - Ks \times Ts + C \qquad (1)$$

Here, the Tset is a set temperature set by the temperature setting switch, the Tr is the inside air temperature detected by the inside air temperature sensor 71, the Tam is an outside air temperature detected by the outside air sensor 72, and the Ts is a solar radiation amount detected by the solar radiation sensor 73. Values of Kset, Kr, Kam and Ks are gains, and a value of C is a correcting constant.
(Step S4)

Next, an air blowing amount, that is, a blower voltage applied to a blower motor 9 is calculated based on the target air temperature DrTAO, PaTAO calculated at step S3. Specifically, blower voltages VA(Dr), VA(Pa) are respectively calculated based on control patterns by using the target air temperatures DrTAO, PaTAO, and then the mean value of the blower voltages VA(Dr), VA(Pa) is calculated as the blower voltage VA.
(Step S5)

Then, a target open degree DrSW(%) of the driver's seat temperature adjustment door 15 and a target open degree PaSW(%) of the front-passenger's seat temperature adjustment door 16 are respectively calculated based on a predetermined formula (2) stored in the memory, by using the target air temperatures DrTAO, PaTAO and input data.

That is, the target open degree SW such as the DrSW and the PaSW is calculated based on target air temperature and the coolant temperature, on respective driver's seat side and front-passenger's seat side. The positions of the temperature adjustment doors 15, 16 are controlled respectively in accordance with the calculated target opening degrees, so that temperatures of conditioned air to be blown into the driver's seat space and the front-passenger's seat space of the vehicle compartment can be adjusted.

$$SW = [(TAO - Te)/(Tw - Te)] \times 100(\%) \qquad (2)$$

Hear, TAO is a target air temperature DrTAO, PaTAO, Tw is the coolant temperature, and Te is a post-evaporator air temperature immediately after passing through the cooling heat exchanger 41. Generally, the temperature of conditioned air to be blown into the vehicle compartment becomes higher as the target open degree SW increases. The target open degree DrSW, PaSW can be respectively calculated by using the target air temperatures DrTAO, PaTAO, based on the above formula (2).
(Step S6)

Then, an air introduction mode such as an outside air introduction mode, an inside air circulation mode and an inside-outside air mixing mode is determined based on the calculated DrTAO, PaTAO.
(Step S7)

A control value (e.g., control current) of the compressor is determined by a feedback control (PI control) so that the air temperature Te immediately after passing through the cooling heat exchanger 41 and detected by the temperature sensor 74 becomes a target temperature.

More specifically, a solenoid electrical current In, which is a target value of the control current is supplied to an electromagnetic solenoid of an electromagnetic control valve attached to the compressor, is calculated based on a calculation formula stored in the memory.

(Step S8)

Then, a control signal (e.g., control voltage VA) determined at step S4 is outputted to a blower drive circuit 8.

(Step S9)

Then, a control signal (e.g., door open degrees DrSW, PaSW) determined at step S5 is outputted to the servomotors 17, 18.

(Step S10)

Next, a control signal regarding an air suction mode determined at step S6 is outputted to the servomotor 5.

(Step S11)

Next, a solenoid electrical current In determined at step S7 is outputted to the electromagnetic solenoid of the electromagnetic control valve attached to the compressor. After step S11 is performed, the control program returns to step S2. Even if the vehicle air conditioner is manually set, the control program shown in FIG. 4 may be performed in accordance with the operation set values.

Next, the one-seat priority mode control at step S35 of FIG. 3 will be described. The one-seat priority mode control is performed when the heating condition is satisfied in a case where the one-seat priority switch 65 is turned on. The one-seat priority mode control is performed such that the air temperature Td to be blown to the driver's seat space is equal to or higher than the air temperature Tp to be blown to the front-passenger's seat space (Td≥Tp).

In the general control of FIG. 4, the driver's seat target air temperature DrTAO and the front-passenger's seat target air temperature PaTAO are calculated based on the formula (1), and then the target cooling temperature TEO of air immediately after passing through the cooling heat exchanger 41 is calculated based on the driver's seat target air temperature DrTAO, the front-passenger's seat target air temperature PaTAO and the outside air temperature Tam. A part of the general control is changed for a period of the one-seat priority mode control so that the one-seat priority mode control of step S35 is performed only for the period.

Even in the one-seat priority mode control, the open degree DrSW(%) of the driver's seat temperature adjustment door 15 and the open degree PaSW(%) of the front-passenger's seat temperature adjustment door 16 are calculated based on a predetermined formula stored in the memory, by using target air temperatures DrTAO, PaTAO in the one-seat priority mode control. That is, the target air temperatures DrTAO, PaTAO in the one-seat priority mode control is different from the target air temperatures DrTAO, PaTAO in the general control.

In the one-seat priority mode control, the calculation of the target air temperatures DrTAO, PaTAO is temporally not performed (clear), and target air temperatures DrTAOP, PaTAOP are determined by using the outside air temperature based on the control map shown in FIG. 5. FIG. 5 is a control map adapted to the one-seat priority mode control at step S35 of FIG. 3, according to the first embodiment.

As shown in the graph of FIG. 5, when the outside air temperature is low, a difference between the target air temperature DrTAOP and the target air temperature PaTAOP in the one-seat priority mode control is small. However, when the outside air temperature becomes higher, the difference between the target air temperature DrTAOP and the target air temperature PaTAOP in the one-seat priority mode control is enlarged.

That is, as the outside air temperature becomes higher, the target air temperature PaTAOP in the one-seat priority mode control is shifted to a cool side, and thereby a low-temperature air is blown toward the front-passenger's seat space of the vehicle compartment. Conversely, in a case where the outside air temperature is low, the cool air on the front-passenger's seat side is easily affected to the driver's seat side. Thus in this case, the temperature adjustment door 16 on the front-passenger's seat side is controlled, so that the temperature of air to be blown toward the front-passenger's seat side is approached to the temperature of air to be blown toward the driver's seat side in the vehicle compartment. For example, in a case where the outside air temperature is −20° C., it is prefer to heat the vehicle compartment by using conditioned air having a temperature of about 50° C. on both the driver's seat side and the front-passenger's seat side, in order to quickly heat the entire vehicle compartment.

Then, the open degree DrSW(%) of the driver's seat temperature adjustment door 15 and the open degree PaSW(%) of the front-passenger's seat temperature adjustment door 16 are calculated based on a predetermined formula stored in the memory by using the target air temperatures DrTAOP, PaTAOP in the one-seat priority mode control, instead of the target air temperatures DrTAO, PaTAO of the general control.

Then, the one-seat priority mode control is performed in the heating operation such that the air temperature Td to be blown to the driver's seat space is equal to or higher than the air temperature Tp to be blown to the front-passenger's seat space (Td≥Tp).

In the one-seat priority mode control, the temperature adjustment door 16 is adjusted to reduce or shut the flow amount of air passing through the heating heat exchanger 42 in the second air passage 12, thereby controlling the air temperature to be blown to the front-passenger's seat space in accordance with air conditioning load. For example, in a case where the outside air temperature is −5° C., the temperature adjustment doors 15, 16 are controlled, such that the air temperature Td based on the target air temperature TAO is about 50° C., and the air temperature Tp on the front-passenger's seat side becomes 25° C., as shown in FIG. 5. In a case where the outside air temperature is high, the cool air on the driver's seat side is hardly affected by air from the front-passenger's seat side. Thus, in this case, the temperature adjustment door 16 on the front-passenger's seat side is shifted to a cool side, so that low-temperature air can be blown toward the front-passenger's seat side in the vehicle compartment.

When the one-seat priority switch 65 is turned OFF, or when the heating condition is not satisfied, the general control is performed at step S34 (control portion D). In the one-seat priority mode control, the other control portions, except for the door open degrees of the temperature adjustment doors 15, 16, are similar to the control portions from steps S1 to S11.

Next, operation and effects of the vehicle air conditioner according to the first embodiment will be described.

In the air conditioning unit 1 of the first embodiment, the temperature adjustment mechanisms (15, 16) are provided so as to be capable of independently adjusting the driver's seat space and the front-passenger's seat space in the vehicle compartment having at least the driver's seat and the front-passenger's seat, for example.

In the present embodiment, a determination means (e.g., step S32 of FIG. 3) for determining whether only the driver exists on the driver seat is provided. Furthermore, a heating operation determination means (e.g., step S33 of FIG. 3) for determining whether the air conditioning state on the driver's seat side is the heating condition by using the operation positions of the temperature adjustment mechanisms 15, 16.

In the air conditioning ECU 10, when the determination means determines that only the driver exists in the vehicle compartment and when the heating condition is determined by the heating operation determining means, the temperature adjustment mechanisms 15, 16 are controlled to perform the one-seat priority mode control such that the air temperature to be blown toward the front-passenger's seat side is lower than the air temperature to be blown toward the driver's seat side in the vehicle compartment.

In the present embodiment, a shutting mechanism for completely shutting air outlets for the front-passenger's seat side and the rear seat side is not provided. Even in this case, when it is determined that only the driver exists on the driver seat, the temperature adjustment mechanisms 15, 16 are controlled such that a radiation amount of the vehicle air conditioner used for any seats other than the driver's seat is smaller than a radiation amount of the vehicle air conditioner used for the driver's seat.

Figure 6:
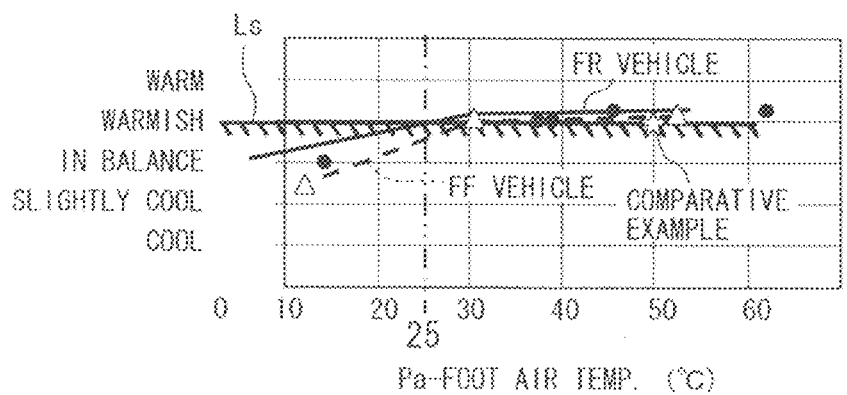
FIG. 6 is a graph showing a result of a thermal feeling test in the first embodiment and in a comparative example.

FIG. 6 is a graph showing a result of a thermal feeling test in the first embodiment. In FIG. 6, the horizontal axis indicates a foot air temperature (Pa-FOOT air temperature) blown from the foot air outlet on the front-passenger's seat side (Pa), and the vertical axis indicates a thermal feeling.

In the thermal feeling test of FIG. 6, the thermal feeling is estimated in a case where the air temperature to be blown toward the front-passenger's seat side is reduced while the air temperature to be blown toward the driver's seat side is fixed to 50° C. Furthermore, the test of FIG. 6 is performed in a condition where the outside air temperature Tam is fixed and the solar radiation amount entering into the vehicle compartment is zero.

In FIG. 6, Ls indicates a desirable standard heating level to be achieved. Generally, in FR vehicles, there is no an interruption portion which interrupts conditioned air between the driver's seat side and the front-passenger's seat side, and thereby it is possible for the conditioned air to communicate with each other between the driver's seat side and the front-passenger's seat side.

In FF vehicles, there is an interruption portion which interrupts communication of conditioned air between the driver's seat side and the front-passenger's seat side, and thereby it is possible for the conditioned air to be interrupted from each other between the driver's seat side and the front-passenger's seat side in the vehicle compartment.

As shown in FIG. 6, even when the air temperature to be blown toward the front-passenger's seat side is reduced to about 25° C., the driver's thermal feeling is over the line Ls in the FF vehicle and FR vehicle, similarly to the four-seat vehicle (comparative example). Furthermore, the thermal feeling in the FR vehicle is improved more than the FF vehicle.

The comparative example (four-seat vehicle) shown in FIG. 6 is a general vehicle without having independent control on the driver's seat side (Dr) and the front-passenger's seat side (Pa), and is set to blow warm air having 50° C. into the driver's seat foot air outlet and the front-passenger's seat foot air outlet.

Figure 7:
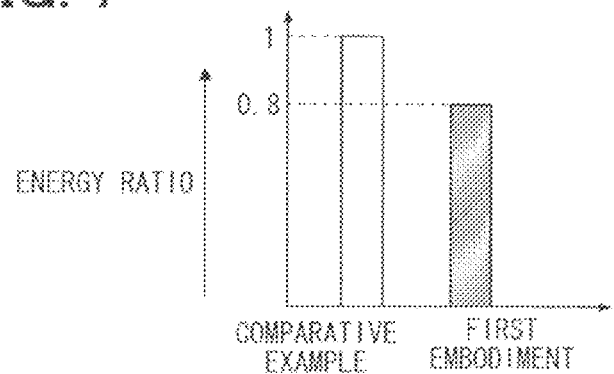
FIG. 7 is a graph showing an energy ratio in the first embodiment and a comparative example.

FIG. 7 is a graph showing an energy ratio consumed in the vehicle air conditioner of the first embodiment and in the comparative example. The test condition of FIG. 7 is similar to the test condition of FIG. 6.

As shown in FIG. 7, in the vehicle air conditioner, the consumed energy is reduced to 80%, as compared with the comparative example, in which it is impossible to perform the one-seat priority mode control.

In the present embodiment, even when the air outlet mode switching mechanism is not provided and it is impossible to completely shut the front-passenger's seat air outlet from which conditioned air is blown toward the front-passenger's seat side of the vehicle compartment, by reducing the air temperature to be blown toward the front-passenger's seat side, the heating quantity in the heating operation can be effectively reduced. Thus, the load of the engine can be reduced.

Furthermore, in the present embodiment, the temperature adjustment mechanism of the heating heat exchanger 42 is configured by the driver's seat temperature adjustment door 15 and the front-passenger's seat temperature adjustment door 16.

According to the present embodiment, the driver's seat temperature adjustment door 15 and the front-passenger's seat temperature adjustment door 16 are respectively independently controlled. Thus, even if the shutting mechanism for completely shutting the air outlets for the front-passenger's seat side and the rear seat side is not provided, when it is determined that only the driver exists on the driver seat, the radiation amount of the vehicle air conditioner used for any seats other than the driver's seat can be made smaller than the radiation amount of the vehicle air conditioner used for the driver's seat by using the temperature adjustment doors 15, 16.

In the present embodiment, the air conditioning unit 1 is provided with the foot air outlet 23a from which the conditioned air is blown toward the foot area of the driver seated on the driver seat in the vehicle compartment, and the knee air outlet 27 from which the conditioned air is blown toward the knee portion of the driver seated on the driver seat in the vehicle compartment. Only when only the driver is on the driver's seat (i.e., the occupant number is 1) and the heating operation determination means determines the heating condition (e.g., heating operation), the temperature adjustment mechanisms 15, 16 are controlled such that the air temperature to be blown toward the front-passenger's seat side (Pa) in the vehicle compartment is lower than the air temperature to be blown toward the driver's seat side (Dr) in the vehicle compartment.

When the driver's seat priority heating is performed, the cool air flows from the front-passenger's seat side to the driver's seat side in the vehicle compartment. However, in the present embodiment, because the conditioned air is blown toward the knee portion of the driver in the vehicle compartment via the knee air outlet 27, it can prevent an unpleasant feeling of the knee portion of the driver.

Furthermore, the outside air temperature sensor 72 is provided to detect an outside air temperature outside of the vehicle compartment, and the operation of the front-passenger's seat temperature adjustment mechanism 16 is controlled by the air conditioning ECU 10 such that the temperature of air blown toward the front-passenger's seat side becomes higher as the outside air temperature becomes lower.

Furthermore, because the operation of the front-passenger's seat temperature adjustment mechanism 16 is controlled by the air conditioning ECU 10 such that the temperature of air blown toward the front-passenger's seat side of the vehicle compartment becomes higher as the outside air temperature becomes lower, it can prevent the cool feeling from being given to the driver while the driver's seat side space can be preferentially heated when the outside air temperature is low.

The air conditioning ECU 10 calculates the target air temperature TAO based on the set temperature set by an occupant such the driver or the front-passenger in the vehicle compartment, at step S3 of FIG. 4. Then, the temperature adjustment mechanisms (15, 16) are controlled based on the calculated target air temperature TAO.

In the air conditioning ECU 10, when the determination means determines that only the driver exists in the vehicle compartment and when the heating operation is determined by the heating operation determining means, the temperature adjustment mechanisms (15, 16) are controlled to perform the one-seat priority mode control so that a temperature difference between air to be blown toward the front-passenger's seat side (Pa) and air to be blown toward the driver's seat side (Dr) is enlarged as the outside air temperature becomes lower.

Thus, when the heating load is high on the driver's seat side, the heat quantity of air blown toward the front-passenger's seat side is reduced as much as possible while it can prevent the driver from getting a cooling feeling. Therefore, heat quantity required in the entire heating of the vehicle compartment can be reduced, thereby improving the fuel consumption efficiency of the vehicle.

Second Embodiment

Next, a second embodiment of the invention will be described with reference to FIGS. 8 and 9. In the present embodiment and the following embodiments, a part that corresponds to a matter described in the above first embodiment may be assigned with the same reference numeral, and the explanation for the part may be omitted. Only different structures and features different from the above-described first embodiment will be mainly described in the present embodiment and the following embodiments.

In the second embodiment, an inside/outside air two-layer separable unit is adapted as an air conditioning unit 1 of the second embodiment. The inside/outside air two-layer separable unit is adapted to be capable of setting an inside/outside air two-layer mode described in JP 2003-165322A, which is incorporated herein by reference in its entirety. In the air conditioning unit 1, it is possible to set an inside air mode and an outside air mode in addition to the inside/outside air two-layer mode.

Figure 8:
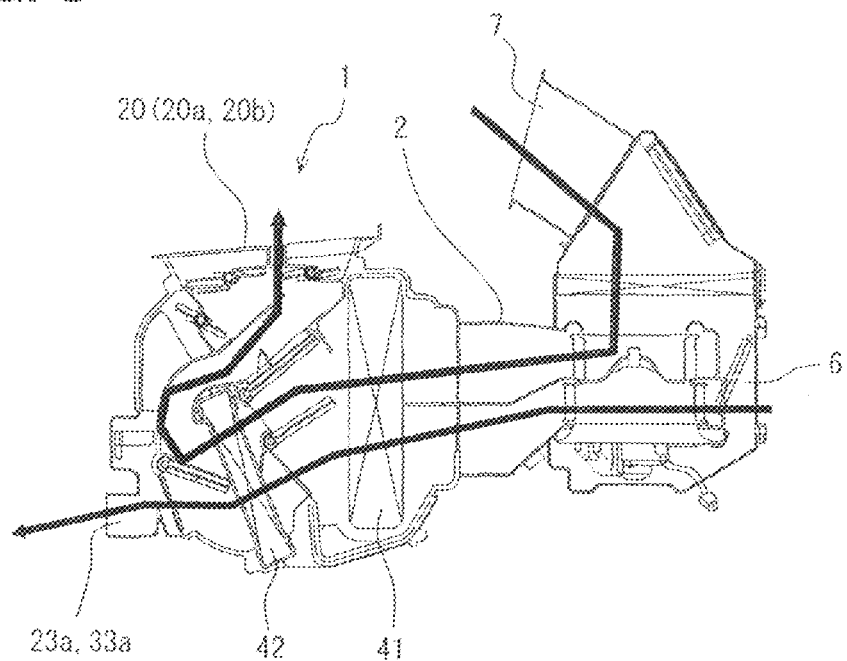
FIG. 8 is a schematic diagram showing an air conditioning unit with an inside/outside air two-layer mode according to a second embodiment of the present invention.
Figure 9:
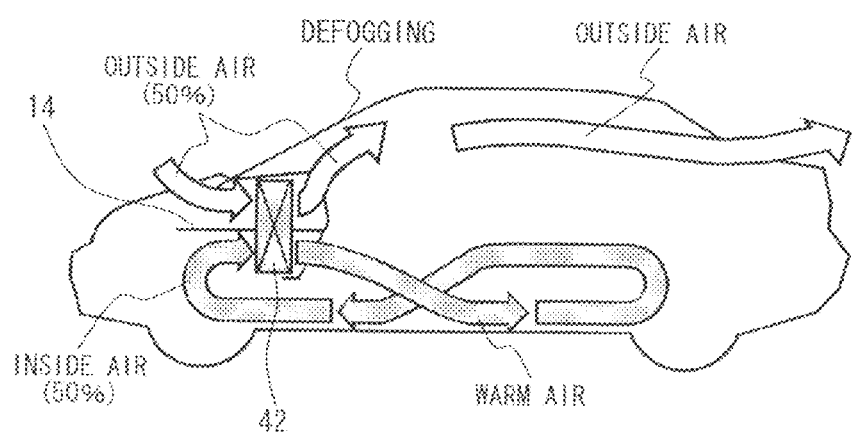
FIG. 9 is a diagram for explaining a flow of air in a vehicle having the air conditioning unit with the inside/outside air two-layer mode according to the second embodiment.

FIG. 8 is a schematic diagram showing the air conditioning unit 1 with the inside/outside air two-layer mode according to the second embodiment of the present embodiment, and FIG. 9 is a diagram for explaining a flow of air in a vehicle having the air conditioning unit 1 with the inside/outside two-layer mode according to the second embodiment.

As shown in FIGS. 8 and 9, the air conditioning unit 1 is provided with an inside air introduction port 6 from which inside air (i.e., air inside the vehicle compartment) is introduced and an outside air introduction port 7 from which outside air (i.e., air outside the vehicle compartment) is introduced. In the inside/outside air two-layer mode, the outside air having a low humidity introduced from the outside air introduction port 7 passes through the cooling heat exchanger 41 and the heating heat exchanger 42 in the air conditioning unit 1 and is blown from the defroster air outlet 20 toward the windshield so as to defog the windshield, while the inside air introduced from the inside air introduction port 6 and having a relative high temperature is blown toward the foot area from foot air outlets 23a, 33a.

In the air conditioning unit 1 of the second embodiment, other parts are similar to those of the above-described first embodiment shown in FIG. 1. The air conditioning unit 1 of the second embodiment may be configured to set the inside/outside air two-layer mode when the one-seat priority switch 65 is turned on and the heating condition is satisfied at step S33 of FIG. 3, such that inside air is blown toward the foot area of the driver in the vehicle compartment from the foot air outlet 23a. Thus, in the one-seat priority mode control, the temperature adjustment door 16 on the front-passenger's seat side can be set at the maximum cool side (MAX COOL), so that air does not pass the heating heat exchanger 42 in the second air passage 12 on the front-passenger's seat side (see FIG. 1).

Thus, by using the synergistic effect of the inside/outside air two-layer mode and the configuration of the first embodiment, the heating operation on the driver's seat side can be effectively performed in the one-seat priority mode control.

In the air conditioning unit 1 of the second embodiment, it is possible to set the inside/outside air two-layer mode when the one-seat priority switch 65 is turned on and the heating condition is satisfied, such that inside air is blown toward the foot area of the driver in the vehicle compartment from the foot air outlet 23a. Thus, in the one-seat priority mode control, the temperature adjustment door 16 on the front-passenger's seat side can be set at the maximum cool side (MAX COOL), so that air does not pass the heating heat exchanger 42 in the second air passage 12 on the driver's seat side (see FIG. 1).

Because it is unnecessary to have a heat quantity on the front-passenger's seat side, the heating operation on the front-passenger's seat side can be effectively performed. Therefore, the energy consumed in the air conditioning unit 1 of the second embodiment can be more effectively reduced as compared with the first embodiment.

When the inside/outside air two-layer mode is set in the air conditioning unit 1, the outside air flows on an upper side and the inside air flows on a lower side in the air conditioning unit 1. When the outside air mode is set, only outside air is blown into the upper side in the vehicle compartment via an upper side passage. Furthermore, when the inside air mode is set in the air conditioning unit 1, only inside air flows toward a lower side (foot area of an occupant) in the vehicle compartment via a lower side passage.

In the air conditioning ECU 10, when the determination means determines that only the driver exists in the vehicle compartment and when the heating condition is determined by the heating operation determining means, the temperature adjustment mechanisms (15, 16) are controlled to perform the one-seat priority mode control such that the air temperature to be blown toward the front-passenger's seat side is lower than the air temperature to be blown toward the driver's seat side in the vehicle compartment.

That is, when it is determined that only the driver exists on the driver seat, the temperature adjustment mechanisms (15, 16) are controlled such that the radiation amount of the vehicle air conditioner used for any seats other than the driver's seat is smaller than the radiation amount of the vehicle air conditioner used for the driver's seat.

In addition, when the outside air mode is set in the air conditioning unit 1, only outside air flows toward an upper side in the vehicle compartment. Furthermore, when the inside air mode is set in the air conditioning unit 1, only inside air flows toward a lower side (foot area of an occupant) in the vehicle compartment.

In this case, when only the driver exists in the vehicle compartment, the air to be blown toward the lower side (foot area) of the driver can be preferentially heated, while inside air without being heated can be blown toward the lower side of the front-passenger seat of the vehicle compartment. Because only the inside air without being heated is blown toward the lower side of the front-passenger's seat of the vehicle compartment, the temperature of air to be blown toward the lower side of the front-passenger's seat of the vehicle compartment becomes lower than the temperature of air blown toward the lower side of the driver's seat of the vehicle compartment. In this case, it is unnecessary to have a heating energy on the front-passenger's seat side, thereby further reducing heat quantity consumed in the entire vehicle compartment. In the second embodiment, the other parts are similar to those of the above-described first embodiment.

Third Embodiment

Next, a third embodiment of the invention will be described with reference to FIGS. 10 to 12. In the third embodiment, a window clouding determination means is further provided with respect to the vehicle air conditioner of the first embodiment or the second embodiment. For example, as the window clouding determination means, a humidity detection sensor for detecting a relative humidity on the inner surface of the windshield may be provided, so as to detect a heavy clouding state (danger state) which interrupts a general vehicle driving. Furthermore, a window clouding state may be determined by using at least one of the solar radiation amount, the outside air temperature, the inside air temperature, the vehicle speed, the calculated target air temperature, the blower air amount and the determined air outlet mode, for example.

Figure 10:
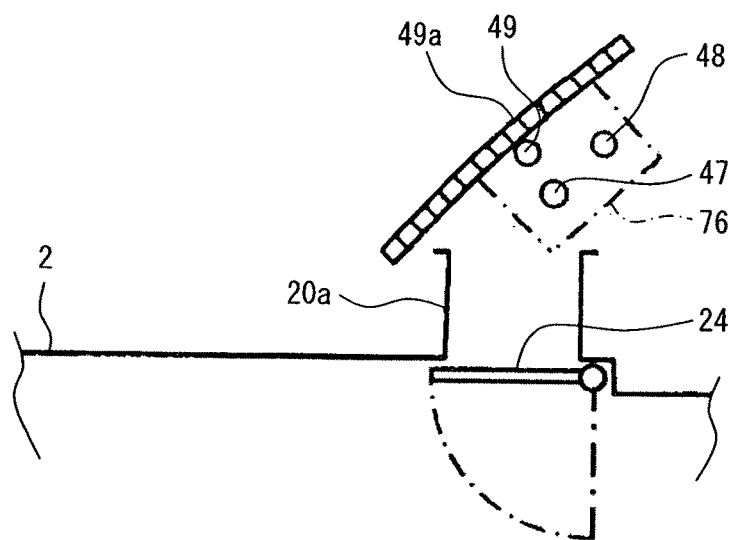
FIG. 10 is a schematic diagram showing an example of a humidity detection sensor attached to a windshield in a vehicle compartment according to a third embodiment of the present invention.

FIG. 10 is a schematic diagram showing an example of a humidity detection sensor 76 attached to a windshield in the vehicle compartment according to the third embodiment of the present invention.

Furthermore, the humidity detection sensor 76 is arranged near the inner surface of the front windshield 49*a* in the passenger compartment of FIG. 10. A humidity sensor portion 47, an air temperature sensor 48, and a glass temperature sensor 49 (window temperature sensor 49) are arranged in the sensing device 110. The humidity and temperature of air near the inner surface of the front windshield 49*a* can be detected by the humidity sensor portion 47. The humidity sensor portion 47 is a capacity change type sensor, for example. A dielectric constant of a humidity sensing film is changed in accordance with a relative humidity of air, and thereby electrostatic capacitance is changed in accordance with the relative humidity of air.

The air conditioning ECU 10 calculates a relative humidity RH of air in the vehicle compartment near the front windshield, based on a value output from the humidity sensor portion 47. That is, the air conditioning ECU 10 memorizes a predetermined computing equation in advance for changing the output value of the humidity sensor portion 47 into the relative humidity RH. The relative humidity RH is calculated by applying the output value of the humidity sensor 47 into this computing equation. The following formula (3) is an example of the humidity computing equation.

$$RH = \alpha V + \beta \quad (3)$$

V indicates the output value of the humidity sensor portion 47, $\alpha$ indicates a control coefficient, and $\beta$ indicates a constant.

Next, the air conditioning ECU 10 calculates a window glass temperature by applying an output value of the window temperature sensor 49 into a predetermined computing equation memorized in advance. Further, a window surface relative humidity RHW is calculated based on the relative humidity RH and the window glass temperature.

That is, the window surface relative humidity RHW is calculated by using a psychometric chart based on the relative humidity RH, the air temperature, and the window glass temperature. About this, the details are disclosed in JP-A-2007-8449, which are incorporated by reference.

Figure 11:
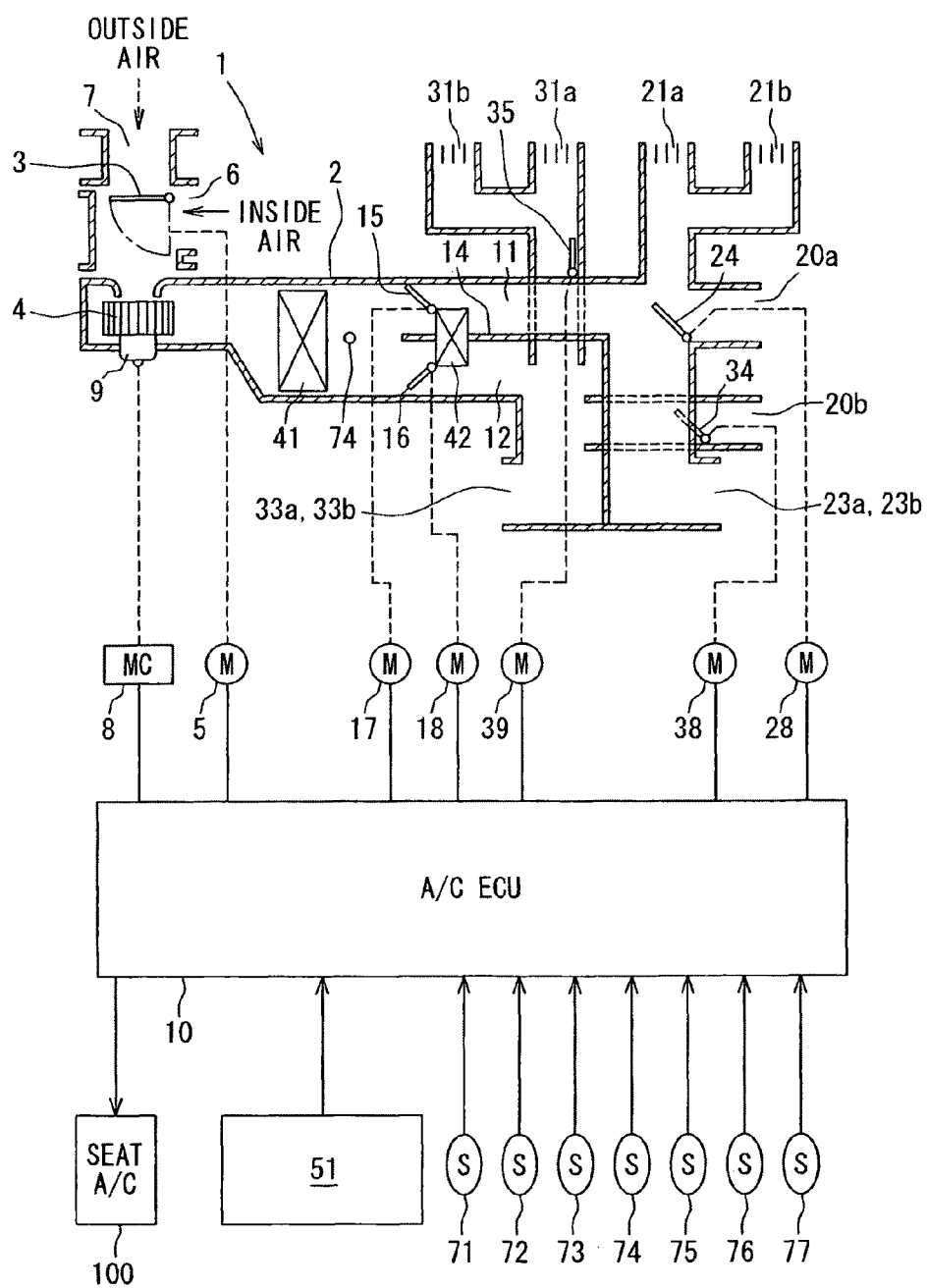
FIG. 11 is a schematic diagram showing an entire structure of a vehicle air conditioner according to the third embodiment.

FIG. 11 is a schematic diagram showing an entire structure of a vehicle air conditioner according to the third embodiment. As shown in FIG. 11, door mechanisms (24, 34, 35) are provided to independently open and close the face air outlets 31*a*, 31*b* and the defroster air outlets 20*a*, 20*b* of an air conditioning unit 1.

When the one-seat priority switch 65 is turned on and when the window clouding determining means determines that there is no window clouding in the heating condition, air blown from the face air outlets 31*a*, 31*b* or the defroster air outlet 20*a*, 20*b* is stopped or the door open degrees of the door mechanisms 24, 34, 35 are adjusted so that only a small air amount smaller than a general control is blown from the face air outlets 31*a*, 31*b* or the defroster air outlets 20*a*, 20*b*. Control signals are output from the air conditioning ECU 10 to the servomotors 28, 38, 39, so as to control the door open degrees of the door mechanisms 24, 34, 35. The reason will be explained below by using FIG. 12.

Figure 12:
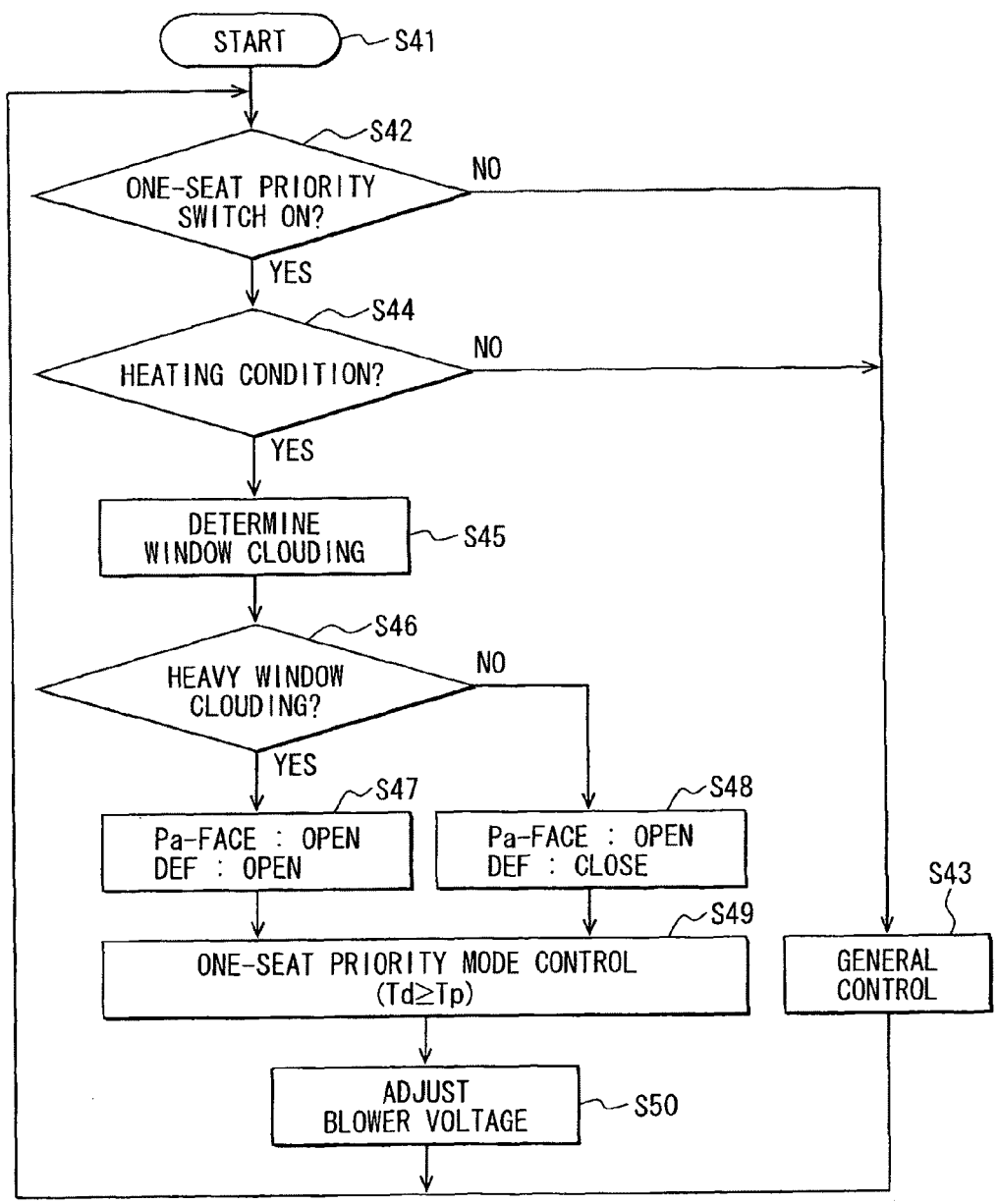
FIG. 12 is a flow diagram showing a control example of an air conditioning ECU of the vehicle air conditioner according to the third embodiment.

FIG. 12 is a flow diagram showing a control example of the air conditioning ECU 10 according to the third embodiment. In FIG. 12, when the control of step S41 starts, it is determined whether the one-seat priority switch 65 of FIG. 2 is turned ON at step S42.

When the one-seat priority switch 65 is not turned ON, a general control is performed at step S43. In contrast, when the one-seat priority switch 65 is turned on, it is determined whether a heating condition is satisfied at step S44.

It is determined that the heating condition is satisfied, when the outside air temperature is lower than a predetermined temperature (e.g., 20° C.) and when the target air temperature (TAO) to be blown into the vehicle compartment is higher than a predetermined temperature (e.g., 25° C.).

In the present embodiment, the air outlet mode can be settable at least on the driver's seat side by using the air outlet doors 24, 34, in the vehicle air conditioner. In this case, the heating condition mode may be determined to be satisfied when the air outlet mode is a foot mode or a bi-level mode at a time before the one-seat priority switch 65 is turned on, in addition to the above two heating conditions. Because no door is provided for some air outlets in the present embodiment, it can be determined that the heating condition is satisfied, when the outside air temperature is lower than a predetermined temperature (e.g., 20° C.) and when the target air temperature (TAO) to be blown into the vehicle compartment is higher than a predetermined temperature (e.g., 25° C.).

When it is determined that the heating condition is not satisfied at step S44, the general control is performed at step S43. When it is determined that the heating condition is satisfied at step S44, a window clouding is determined at step S45 (window clouding calculating means).

For example, at step S44, the air conditioning ECU 10 calculates a window glass temperature by applying an output value of the window temperature sensor 49 into a predetermined computing equation memorized in advance, and a window-glass surface relative humidity RHW is calculated based on the relative humidity RH and the window glass temperature.

That is, the window surface relative humidity RHW is calculated by using a psychometric chart based on the relative humidity RH, the air temperature, and the window glass temperature. Furthermore, when the window surface relative humidity RHW exceeds a predetermined standard value, a window clouding state signal is output.

At step S46 of FIG. 12, when a predetermined window clouding state (heavy clouding) is determined based on the outputted window clouding state signal, all the front-passenger's seat face air outlets 31a, 31b and the defroster air outlets 20a, 20b are opened or almost of those are opened at step S47.

On the other hand, at step S46 of FIG. 12, when the window clouding state signal is not outputted, it is determined that there is no window clouding, and thereby all the front-passenger's seat face air outlets 31a, 31b and the defroster air outlets 20a, 20b are closed or almost of those are closed at step S48.

Then, the one-seat priority mode control is performed such that the air temperature Td to be blown to the driver's seat space is equal to or higher than the air temperature Tp to be blown to the front-passenger's seat space (Td≥Tp), at step S49.

Next, at S50, a blower voltage is determined, so that an air blowing amount of the blower 4 of FIG. 1 is adjusted. In the present embodiment, because a part of the air outlet ports can be opened and closed in accordance with air outlet doors at steps S47, S48, an air amount blown by the blower 4 can be controlled to have relatively a small variation. A correction amount is calculated in accordance with the door opening and closing state of step S47, S48, and the voltage applied to the motor 9 of the blower 4 can be corrected based on the correction amount.

Specifically, in a case where an air amount blown from the front-passenger's seat face air outlets 31a, 31b or the defroster air outlets 20a, 20b is stopped or is reduced smaller than that in the general control, the air blowing amount toward the driver's seat side is increased, thereby adjusting the entire air blowing amount.

In the third embodiment, air outlet doors 24, 34 are provided to respectively and independently open and close the defroster air outlets 20a, 20b, and an air outlet door 35 is provided to open and close the front-passenger's face air outlets 31a, 31b. The front-passenger's face air outlets 31a, 31b are provided to blow conditioned air toward an upper side (face area) of the front-passenger on the front-passenger's seat.

Furthermore, in the present embodiment, the window clouding calculating means is provided to calculate the window clouding state of the vehicle. In the air conditioning ECU 10, when the occupant determination means determines that only the driver exists in the vehicle compartment and when the heating condition is determined by the heating condition determining means, the temperature adjustment mechanisms (15, 16) are controlled to perform the one-seat priority mode control such that the air temperature to be blown toward the front-passenger's seat side is made lower than the air temperature to be blown toward the driver's seat side in the vehicle compartment.

Furthermore, in the one-seat priority mode control, the opening or closing states of the front-passenger's face air outlets 31a, 31b and the defroster air outlets 20a, 20b can be adjusted in accordance with the calculated window clouding state. Thus, the heat quantity consumed in the heating operation of the entire vehicle can be reduced thereby increasing the fuel consumption efficiency of the vehicle, while it can accurately prevent window clouding.

Fourth Embodiment

Figure 13:
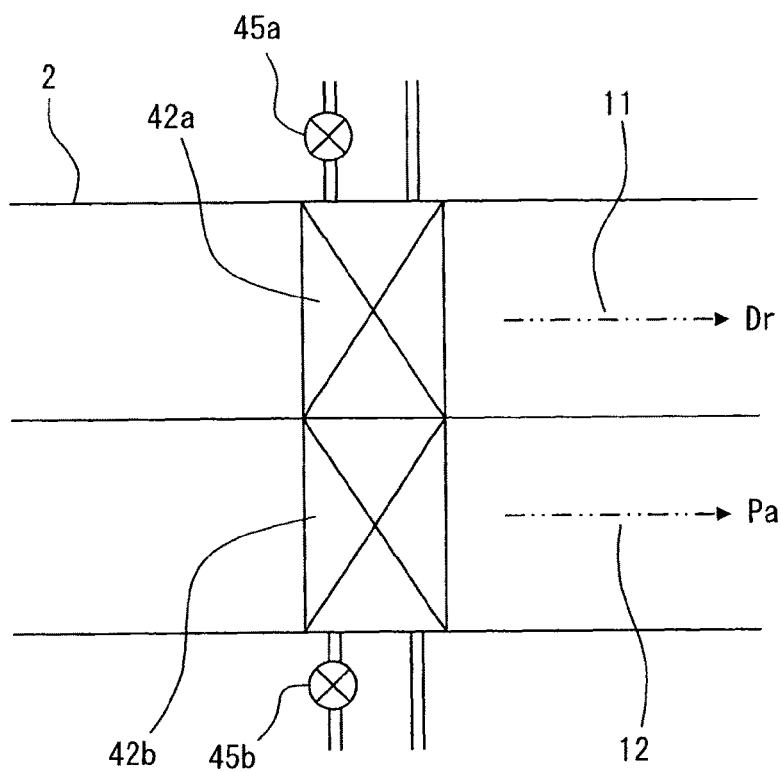
FIG. 13 is a schematic diagram showing an air conditioning unit with a heating heat exchanger according to a fourth embodiment of the present embodiment.

Next, a fourth embodiment of the invention will be described. FIG. 13 is a schematic diagram showing a part of an air conditioning unit with a heating heat exchanger according to the fourth embodiment of the present embodiment. In the present embodiment, the parts different from the first embodiment are mainly described.

In the above-described first embodiment, the air amount passing through the heating heat exchanger 42 is controlled by using the temperature adjustment doors 15, 16 as the temperature adjustment mechanism. In the fourth embodiment, the heat amount of a heating heat exchanger 42a on the driver's seat side (Dr) and the heat amount of a heating heat exchanger 42b on the front-passenger's seat side (Pa) are respectively independently adjusted by using flow adjustment valves 45a, 45b. Therefore, it is possible to reduce the temperature of air to be blown toward the front-passenger's seat side (Pa) to be lower than the temperature of air to be blown toward the driver's seat side (Dr) in the vehicle compartment.

The flow adjustment valve 45a is disposed to adjust a flow amount of engine coolant (hot water) flowing through the heating heat exchanger 42a, and the flow adjustment valve 45b is disposed to adjust a flow amount of engine coolant (hot water) flowing through the heating heat exchanger 42b.

When the one-seat priority switch 65 shown in FIG. 2 is turned on, a one-seat priority mode control is performed by the air conditioning ECU 10, such that the flow amount of the engine coolant flowing through the heating heat exchanger 42b on the front-passenger's seat side is reduced by the flow adjustment valve 45b. That is, control signal is output from the air conditioning ECU 10 to the flow adjustment valve 45b, thereby reducing the flow amount of the engine coolant flowing through the heating heat exchanger 42b on the front-passenger's seat side.

The heating heat exchanger 42a on the driver's seat side and the heating heat exchanger 42b on the front-passenger's seat side are configured such that the engine coolant flows respectively and independently therein.

Furthermore, the flow adjustment valves 45a, 45b are configured to respectively and independently control the flow amount of the engine coolant flowing through the heating heat exchanger 42a on the driver's seat side and the flow amount of the engine coolant flowing through the heating heat exchanger 42b on the front-passenger's seat side. Only when the driver is on the driver's seat (i.e., the occupant number is 1) and the heating operation determination means determines the heating condition (e.g., heating operation), the temperature adjustment mechanisms (45a, 45b) are controlled such that the air temperature to be blown toward the front-passenger's seat side in the vehicle compartment is lower than the air temperature to be blown toward the driver's seat side in the vehicle compartment.

In the present embodiment, when it is determined that only the driver exists on the driver seat in the winter, the flow amount passing through the heating heat exchangers 42a, 42b is respectively controlled, so that the radiation amount of the vehicle air conditioner used for any seat side other than the driver's seat side is smaller than the radiation amount of the vehicle air conditioner used for the driver's seat side. Thus, the heat quantity used for the heating operation can be reduced, thereby improving fuel consumption adapted to the vehicle. In the fourth embodiment, the other parts may be similar to those of the above-described first embodiment or the second embodiment.

Fifth Embodiment

Next, a fifth embodiment of the invention will be described. In the above-described first embodiment, the target air temperature in the one-seat priority mode control is set in accordance with the outside air temperature Tam shown in the map of FIG. 5. However, in the fifth embodiment, the target air temperature in the one-seat priority control is set in accordance with the driver's seat target air temperature DrTAO.

Figure 14:
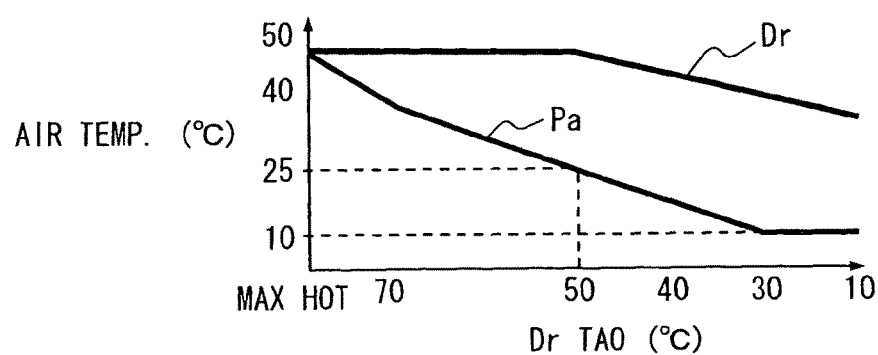
FIG. 14 is a control map adapted to a one-seat priority mode control of an air conditioning ECU according to a fifth embodiment of the present embodiment.

FIG. 14 is a control map adapted to the one-seat priority mode control of an air conditioning ECU 10 according to the fifth embodiment of the present embodiment, and corresponds to the one-seat priority mode control at step S35 of FIG. 3 of the above first embodiment. That is, in the fifth embodiment, the air temperature to be blown into the driver's seat side (Dr) and the front-passenger's seat side (Pa) of the vehicle compartment in the one-seat priority mode control is controlled based on the target air temperature on the driver's seat side (DrTAO).

Because the driver's seat target air temperature DrTAO is controlled by using control factors such as the set temperature, the solar radiation amount, the outside air temperature, the inside air temperature and the like, the one-seat priority mode control can be performed by using the plural control factors. In the fifth embodiment, the other parts may be similar to those of the above-described first embodiment.

Sixth Embodiment

Figure 15:
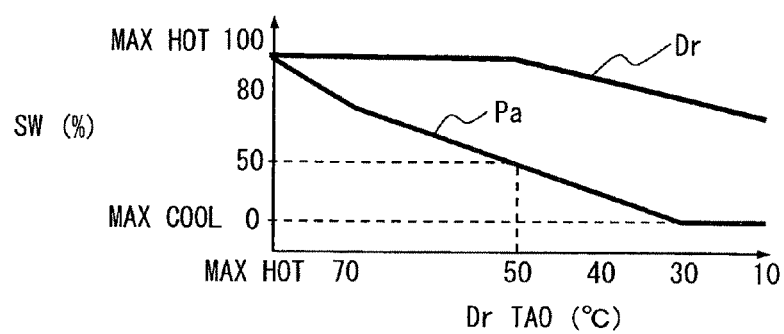
FIG. 15 is a control map adapted to a one-seat priority mode control of an air conditioning ECU according to a sixth embodiment of the present embodiment.

Next, a sixth embodiment of the invention will be described. FIG. 15 is a control map adapted to the one-seat priority mode control of an air conditioning ECU 10 according to the fifth embodiment of the present embodiment, and corresponds to the one-seat priority mode control at step S35 of FIG. 3 of the above first embodiment.

In the above-described first embodiment, the target air temperature in the one-seat priority mode control is set in accordance with the outside air temperature shown in the map of FIG. 5. However, in the sixth embodiment, the open degrees SW of the temperature adjustment doors 15, 16 on the driver's seat side (Dr) and on the front-passenger's seat side (Pa) in the one-seat priority control is set in accordance with the driver's seat target air temperature DrTAO.

As described in the above embodiments, in the general control, the open degrees SW of the temperature adjustment doors 15, 16 are calculated based on the target temperature TAO, the coolant temperature Tw, the air temperature Te cooled by the cooling heat exchanger. However, in the one-seat priority control, the open degree SW of the temperature adjustment door 15 on the driver's seat side (Dr) and the open degree SW of the temperature adjustment door 16 on the front-passenger's seat side (Pa) are directly controlled by using the driver's seat target air temperature DrTAO based on the control map shown in FIG. 15. In the sixth embodiment, the other parts may be similar to those of the above-described first embodiment.

Seventh Embodiment

Next, a seventh embodiment of the invention will be described with reference to FIG. 16. In the present embodiment, a vehicle air conditioner for the vehicle compartment is typically combined with a seat air conditioning unit. As the seat air conditioning unit, a PCT heater or a heating wire may be arranged in a seat part of a driver's seat such that conditioned air heated by the Peltier device is blown from a porous seat surface. Thus, the seat air conditioning unit can be combined with the vehicle air conditioner.

Figure 16:
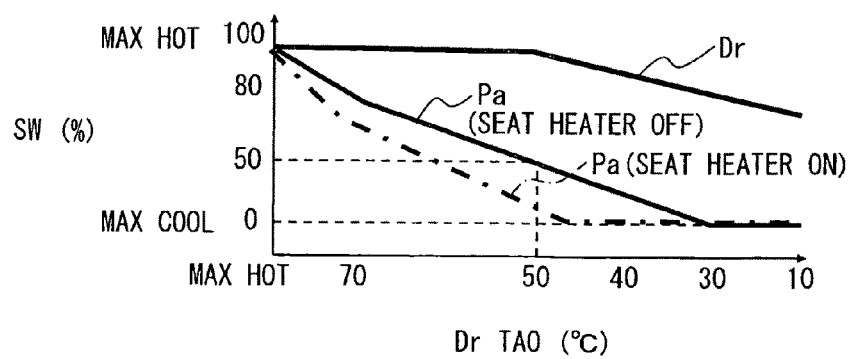
FIG. 16 is a control map adapted to a one-seat priority mode control of an air conditioning ECU according to a seventh embodiment of the present embodiment.

FIG. 16 is a control map adapted to the one-seat priority mode control of an air conditioning ECU 10 according to the seventh embodiment of the present embodiment, and corresponds to the one-seat priority mode control at step S35 of FIG. 3 of the above first embodiment. In the seventh embodiment, as shown in FIG. 16, when a seat heater on the front-passenger's seat side (Pa) is turned on, a front-passenger's seat temperature characteristic is moved to a low temperature side, as compared with a case where the seat heater on the front-passenger's seat side (Pa) is turned off. In the one-seat priority mode control, the seat heater on the front-passenger's seat side may be partially turned on at a position near the driver's seat, or may be turned off.

According to the seventh embodiment, a seat heater is also provided in the front-passenger's seat to directly heat the front-passenger's seat, while a seat heater is provided in the driver's seat to directly heat the driver's seat. Furthermore, in the one-seat priority mode control, the temperature adjusting mechanism such as the temperature adjustment door 16 is controlled so that the air temperature to be blown toward the front-passenger's seat is made lower than the air temperature to be blown toward the driver's seat side in the vehicle compartment. More specifically, a heating target temperature (e.g., SW) on the front-passenger's seat side and a heating target temperature (e.g., DrTAO) on the driver's seat side are calculated such that the temperature of air blown toward the front-passenger's seat side is lower than the air temperature blown toward the driver's seat side in the vehicle compartment.

As the heating target temperature on the front-passenger's seat side, the target air temperature on the front-passenger's seat side (PaTAO) may be calculated. That is, if the air temperature to be blown toward the front-passenger's seat side is lower than the air temperature to be blown toward the driver's seat side in the one-seat priority mode control, other control factors may be used in the one-seat priority mode control.

In the present embodiment, when the seat air conditioning unit is operated, the heating target temperature on the front-passenger's seat side may be set lower than that when the seat air conditioning unit is stopped. Thus, the heat quantity consumed in the heating operation of the entire vehicle can be reduced, thereby increasing the fuel consumption efficiency of the vehicle. In the seventh embodiment, the other parts may be similar to those of the above-described first embodiment.

Eighth Embodiment

Figure 18:
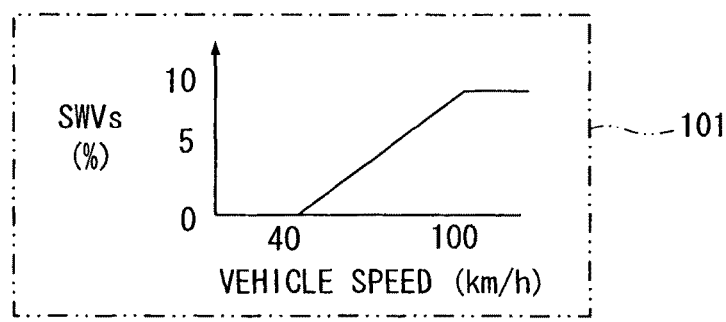
FIG. 18 is a map for calculating a vehicle-speed correction value according to the eighth embodiment.
Figure 19:
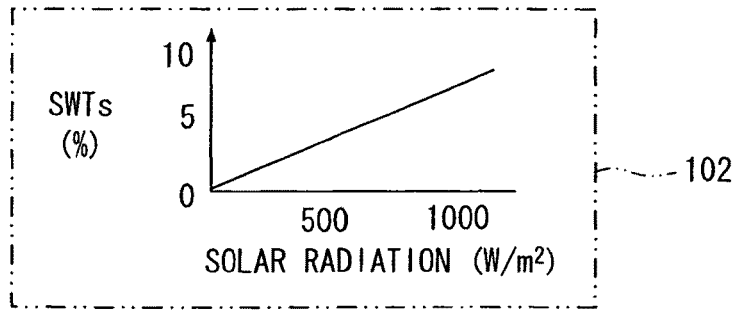
FIG. 19 is a map for calculating a solar-radiation correction value according to the eighth embodiment.

An eighth embodiment of the present invention will be described with reference to FIGS. 17 to 19.

In a vehicle air conditioner of the eighth embodiment, an open degree SWO of the temperature adjustment door 15, 16 is corrected based on a variation of the vehicle speed and a variation of the solar radiation amount entering into the vehicle compartment.

Figure 17:
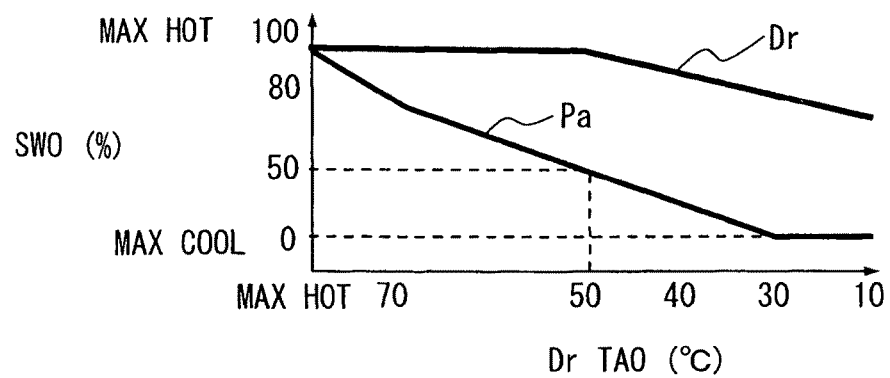
FIG. 17 is a control map adapted to a one-seat priority mode control of an air conditioning ECU according to an eighth embodiment of the present embodiment.

FIG. 17 is a control map adapted to the one-seat priority mode control of an air conditioning ECU 10 according to the eighth embodiment of the present embodiment, and corresponds to the one-seat priority mode control at step S35 of FIG. 3 of the above first embodiment. FIG. 18 is a map for calculating a vehicle-speed correction value SWVs in a vehicle speed correction portion 101, adapted in the control map of FIG. 17. FIG. 19 is a map for calculating a solar-radiation correction value SWTs in a solar radiation correction portion 102, adapted in the control map of FIG. 17.

When the vehicle speed is high, the windshield of the vehicle is cooled, and occupant may feel cool transmitted from the windshield. In contrast, if the solar radiation amount entering into the vehicle compartment is increased, the occupant may feel warm. In the eighth embodiment, the open degrees SWO of the temperature adjustment door 15 on the driver's seat side (Dr) and the open degree SWO of the temperature adjustment door 16 on the front-passenger's seat side (Pa) are determined based on the target air temperature DrTAO on the driver's seat side. Furthermore, the open degree SWO of the temperature adjustment door 16 on the front-passenger's seat side (Pa) is corrected based on the vehicle speed correction value SWVs and the solar radiation correction value SWTs. The open degrees SWO of the temperature adjustment door 15 on the driver's seat side (Dr) may be the unnecessary to be corrected, and may be directly used as the final open degree SW of the temperature adjustment door on the driver's seat side (Dr).

Then, the final open degree SW (Final) of the temperature adjustment door on the front-passenger's seat side is calculated $$SW(\text{Final}) = SWO + SWVs - SWTs \quad (4)$$

In the eighth embodiment, the heating due to the one-seat priority mode control is performed such that the temperature of conditioned air blown toward the front-passenger's seat side becomes higher as the vehicle speed becomes higher or becomes lower as the solar radiation amount entering into the vehicle compartment becomes larger.

Thus, the air temperature to be blown toward the front seat side can be suitably controlled based on the vehicle speed and the solar radiation amount entering into the vehicle compartment, thereby assisting the heating operation of the one-seat priority mode control. The heating load is low on the driver's seat side when the solar radiation amount is increased. In this case, the heat quantity of air blown toward the front-passenger's seat side is reduced as much as possible. Therefore, heat quantity required in the entire heating of the vehicle compartment can be reduced, thereby improving the fuel consumption efficiency of the vehicle.

Ninth Embodiment

Next, a ninth embodiment of the invention will be described with reference to FIGS. 20 to 22D. In the above-described embodiments, the left-right independent temperature control means is provided to perform left and right independent control operation at least in the one-seat priority mode control in the heating operation in the winter. In a vehicle air conditioner of the ninth embodiment, a top-down independent temperature control means is provided in addition to the left-right independent temperature control means.

In the ninth embodiment, in the one-seat priority mode control, the air temperature blown toward the lower side of the front-passenger's seat is reduced while the air temperature blown toward the upper side of the driver's seat is not reduced. Thus, it can prevent the driver from feeling cool due to the air blown toward the front-passenger's seat side, in the one-seat priority mode control.

That is, in the one-seat priority mode control, the top-bottom temperature control means is provided such that the temperature of air blown from an air outlet toward the lower side of the front-passenger's seat is lower than the temperature of air blown from the other air outlets into the vehicle compartment.

Figure 20:
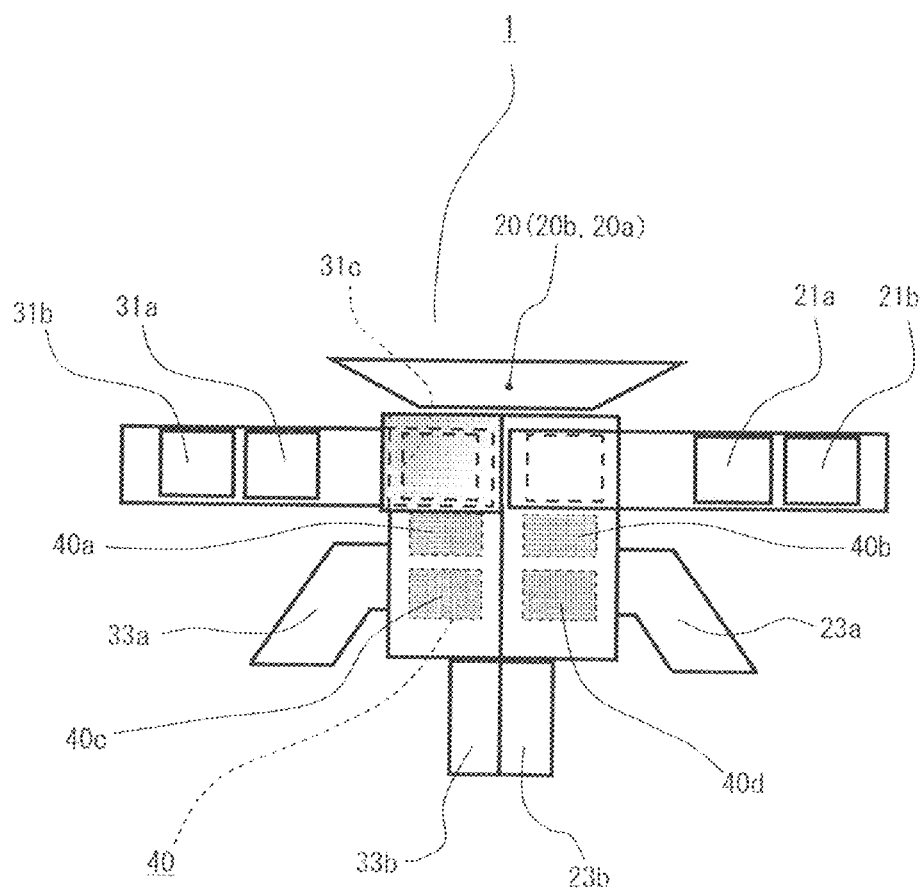
FIG. 20 is a schematic diagram showing an air conditioning unit according to a ninth embodiment of the invention.

Next, the detail structure of the vehicle air conditioner will be described. FIG. 20 is a schematic diagram showing an air conditioning unit 1 according to the ninth embodiment of the invention. The air conditioner of the present embodiment has an adjustment function for adjusting an air amount to be blown toward an upper side (face area) of the front-passenger's seat side. Furthermore, a left-right independent temperature control means and a top-bottom independent temperature control means are provided. In addition, an air amount blown from a front-passenger's face air outlet toward the upper side of the front-passenger's seat can be adjusted by an air-outlet open changing mechanism that may be provided in the air conditioning unit, an air conditioning duct or the front-passenger's face air outlet.

In FIG. 20, the air conditioning unit 1 is provided with a defroster air outlet 20 from which conditioned air is blown toward the inner surface of the windshield. The defroster air outlet 20 is partitioned into a driver's seat side defroster air outlet 20a and a front-passenger's seat defroster air outlet 20b.

Furthermore, the air conditioning unit 1 is provided with driver's seat face air outlets 21a, 21b, front-passenger's seat face air outlets 31a, 31b, a driver's seat foot air outlet 23a, a front-passenger's seat foot air outlet 33a, and rear seat foot air outlets 23b, 33b.

Furthermore, the air conditioning unit 1 is provided with a face opening/closing mechanism 31c on the front-passenger's seat side, a left-top independent temperature control portion 40a, a right-top independent temperature control portion 40b, a left-bottom independent temperature control portion 40c, and a right-bottom independent temperature control portion 40d. The independent temperature control portions 40a, 40b, 40c, 40d are configured to form a left-right and top-bottom independent temperature control means 40.

The independent temperature control means 40 may include a cooling heat exchanger, a heating heat exchanger and an air mixing door, for each air outlet.

For example, the temperature of air to be blown to respective air outlets may be controlled by the air mixing door such that a flow ratio of air passing through the heating heat exchanger and air bypassing the heating heat exchanger can be adjusted.

Alternatively, a flow adjustment mechanism for adjusting the flow amount of the engine coolant may be used instead of the air mixing door, similarly to the example of FIG. 13. In this case, the temperature of air to be blown to respective air outlets can be controlled by the flow adjustment mechanism such that a temperature of air passing through the respective heating heat exchangers can be adjusted.

Figure 21:
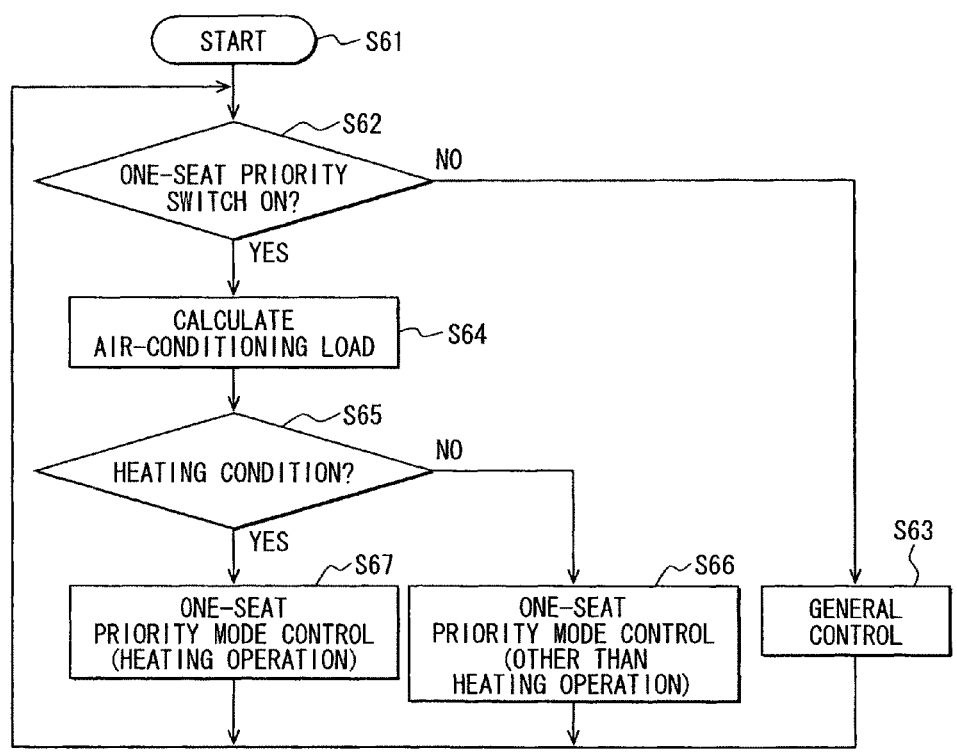
FIG. 21 is a flow diagram showing a control example of an air conditioning ECU according to the ninth embodiment.

In the present embodiment, the one-seat priority switch 65 or the like may be provided on the air conditioning operation panel 51, similarly to the example of FIG. 2. FIG. 21 is a flow diagram showing a control example of an air conditioning ECU 10 according to the ninth embodiment. In FIG. 21, when the control of step S61 starts, it is determined whether the one-seat priority switch 65 of FIG. 2 is turned ON at step S62. When the one-seat priority switch 65 is not turned ON, a general control is performed at step S63.

In contrast, when the one-seat priority switch 65 is turned on, the air-conditioning load is calculated at step S64. The air conditioning load can be calculated based on the target air temperature TAO or a difference between the outside air temperature and a predetermined temperature, or a difference between the inside air temperature and a predetermined temperature, or the like. The target air temperature TAO is calculated based on the outside air temperature, the temperature inside the vehicle compartment, the solar radiation amount and a set temperature.

Next, at step S65, it is determined whether a heating condition is satisfied. It is determined that the heating condition is satisfied, when the outside air temperature is lower than a predetermined temperature (e.g., 20° C.) and when the target air temperature (TAO) to be blown into the vehicle compartment is higher than a predetermined temperature (e.g., 25° C.).

In the present embodiment, in a case where the air outlet mode switching door is not provided, the heating condition is determined to be satisfied, when both a first condition where the outside air temperature is lower than the first predetermined temperature (e.g., 20° C.) and a second condition where the target air temperature (TAO) to be blown into the vehicle compartment is higher than a second predetermined temperature (e.g., 25° C.) are satisfied. However, in a case where a vehicle air conditioner is configured to switch an air outlet mode at least on the driver's seat side, the heating condition may be determined to be satisfied when the air outlet mode is a foot mode or a bi-level mode at a time before the one-seat priority switch is turned on, in addition to both the first and second conditions.

When it is determined that the heating condition is not satisfied at step S65 in FIG. 21, a one-seat priority mode control other than the heating mode may be performed at step S66. For example, in the face mode in which conditioned air is blown from face air outlets or in the bi-level mode, the air temperature to be blown toward the front-passenger's seat side may be set higher than the air temperature to be blown toward the driver's seat side at step S66.

When it is determined that the heating condition is satisfied at step S65, a one-seat priority mode control is performed during the heating operation. In the one-seat priority mode control during the heating operation in the winter of step S67, the foot mode is set as the air outlet mode, and the temperature adjustment mechanism (e.g., air mixing door) on the front-passenger's seat side is controlled to a low-temperature side (cool side), as compared with the driver's seat side.

In the ninth embodiment, in the one-seat priority mode control during the heating operation, the temperature adjustment mechanism (e.g., air mixing door) for the lower side of the front-passenger's seat is controlled to a low-temperature side (cool side), thereby further reducing heat quantity consumed in the vehicle air conditioner.

The control of the temperature adjustment door (air mixing door) in the one-seat priority mode during the heating operation will be described with reference to FIGS. 22A to 22D. FIGS. 22A to 22D are schematic diagrams showing operation states of left, right, top and bottom independent temperature control means (40) in the one-seat priority mode control during the heating operation.

Figure 22A:
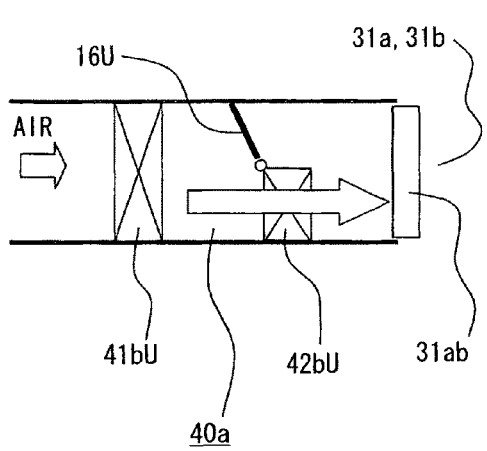
FIGS. 22A to 22D are schematic diagrams showing operation states of left, right, top and bottom independent temperature controls with a one-seat priority mode control according to the ninth embodiment.
Figure 22B:
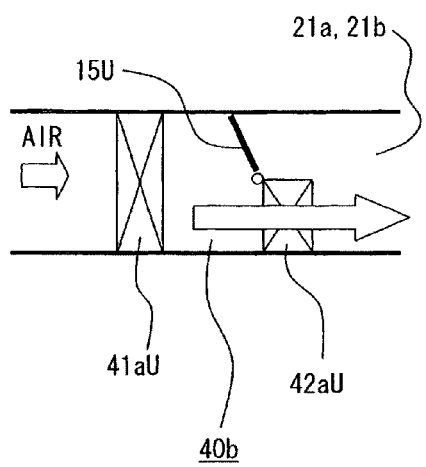
Figure 22C:
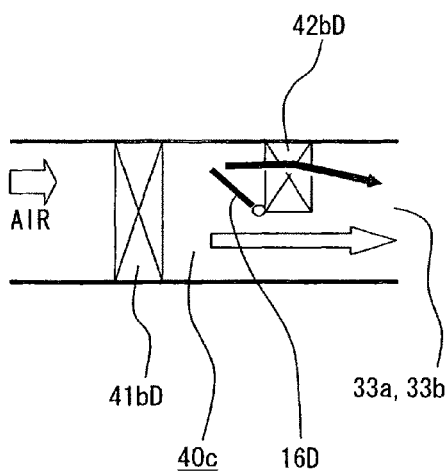
Figure 22D:
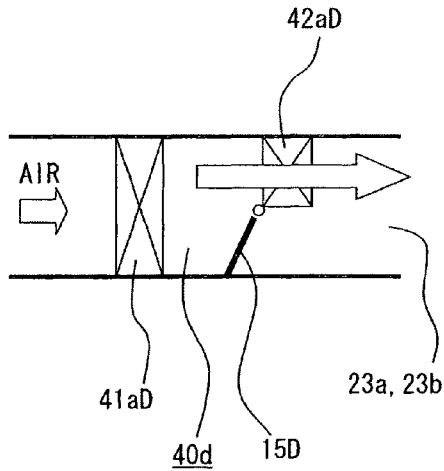

FIG. 22A shows a left-top independent temperature control portion 40a, FIG. 22B shows a right-top independent temperature control portion 40b, FIG. 22C shows a left-bottom independent temperature control portion 40c, and FIG. 22D shows a right-bottom independent temperature control portion 40d. As mentioned above, these independent temperature control portions 40a, 40b, 40c, and 40d form the left-right and top-bottom independent temperature control means 40.

A cooling heat exchanger 41bU (e.g., evaporator), a heating heat exchanger 42bU (e.g., heater core) and a temperature adjustment door (e.g., air mixing door) 16U are provided for the front-passenger's seat face air outlets (31a, 31b) and the front-passenger's seat defroster air outlet, thereby configuring the independent temperature control portion 40a for the front-passenger's seat side, as shown in FIG. 22A. A cooling heat exchanger 41aU (e.g., evaporator), a heating heat exchanger 42aU (e.g., heater core) and a temperature adjustment door (e.g., air mixing door) 15U are provided for the driver's seat face air outlets (21a, 21b) and the driver's seat defroster air outlet, thereby configuring the independent temperature control portion 40b for the driver's seat side, as shown in FIG. 22B. A cooling heat exchanger 41bD (e.g., evaporator), a heating heat exchanger 42bD (e.g., heater core) and a temperature adjustment door (e.g., air mixing door) 16D are provided for the rear foot air outlets (33a, 33b) on the front-passenger's seat side, thereby configuring the independent temperature control portion 40c for the rear seat side, as shown in FIG. 22C. Furthermore, a cooling heat exchanger 41aD (e.g., evaporator), a heating heat exchanger 42aD (e.g., heater core) and a temperature adjustment door (e.g., air mixing door) 15D are provided for the rear foot air outlets (23a, 23b) on the driver's seat side, thereby configuring the independent temperature control portion 40d for the rear seat side, as shown in FIG. 22D.

In the one-seat priority mode control during the heating operation in the winter, the temperature adjustment doors 15U, 15D, 16U are controlled similarly to that in the general control. In contrast, the temperature adjustment door 16D is moved to a cool side (low-temperature side). Furthermore, the front-passenger's seat face air outlets 31a, 31b, the front-passenger's seat defroster air outlet 20b are automatically closed by an air outlet opening/closing mechanism 31ab, as shown in FIG. 22A. The air outlet opening/closing mechanism 31ab includes a front-passenger's face air outlet opening and closing mechanism 31c shown in FIG. 20.

In the ninth embodiment, as shown in FIG. 22A, because the temperature adjustment mechanism 16U for the front-passenger's face air outlet is not moved to the cool side in the one-seat priority mode control during the heating operation, cool air does not flows from the front-passenger's seat side toward the driver's seat side, thereby preventing a decrease of the temperature of air blown toward the upper side of the driver's seat side in the vehicle compartment.

In the present invention, because the front-passenger's seat face air outlets 31a, 31b and the front-passenger's defroster air outlet 20b are automatically closed by the air outlet opening/closing mechanism 31ab in the one-seat priority mode control, the temperature adjustment door 16U for the upper side of the front-passenger's seat side can be controlled to the hot side (e.g., maximum heating position in FIG. 22A).

As shown in FIG. 22C, the temperature adjustment door 16D for the lower side of the front-passenger's seat is controlled to a predetermined position (cool side) from the maximum heating position, thereby reducing the heat quantity consumed in the heating operation. Thus, pleasant air-conditioning can be maintained while the necessary heating quantity can be reduced in the vehicle air conditioner. In a case where the defroster air outlet is not divided into the front-passenger's seat side and the driver's seat side, only the front-passenger's seat face air outlets 31a, 31b may be closed while the defroster air outlet is opened.

Other Embodiments

Although the present invention has been fully described in connection with the preferred embodiments thereof with reference to the accompanying drawings, it is to be noted that various changes and modifications will become apparent to those skilled in the art. The above-described embodiments of the invention may be suitably modified as in the following examples (1) to (14).

(1) In the above-described embodiments, the one-seat priority mode control is performed when the one-seat priority switch 65 is manually operated to be on. However, a seat sensor may be arranged in the respective seats, and the one-seat priority mode control may be automatically performed in the heating condition when the seat sensor determines that only the driver exists on the driver's seat.

Alternatively, instead of the seat sensor, a non-contact sensor (IR sensor) may be provided in the instrument panel or the ceiling of the vehicle so as to detect the occupant in each seat of the vehicle compartment. Alternatively, based on signals from a seal belt attachment or a door opening and closing signal, the occupant in each seat may be determined.

(2) In the above-described first embodiment, all the door mechanisms for all the air outlets are omitted. However, only a door mechanism for only the front-passenger's seat side may be omitted. In this case, door mechanisms may be provided for the driver's seat side, and a driver's seat air outlet may be calculated based on a generally known method.

In this case, the heating condition can be determined by a heating condition determining means at step S33 of FIG. 3 when the air outlet mode is one of a foot mode in which conditioned air is blown from a foot air outlet on the driver's seat side, and a bi-level mode in which conditioned air is blown from both the foot air outlet and the face air outlet on the driver's seat side.

Thus, the heating condition can be accurately determined.

(3) In the above-described first embodiment, the desirable set temperatures are respectively set on the driver's seat side and the front-passenger's seat side, and the target air temperatures TAO are respectively calculated on the driver's seat side and on the front-passenger's seat side. However, the desirable set temperature may be set only for driver's seat side, and the target air temperature may be calculated only for the driver's seat side.

(4) In the above-described first embodiment, it is impossible to switch an air outlet such as a face air outlet, a foot air outlet or a bi-level air outlet. However, the air outlet mode may be calculated based on the TAO. In this case, the heating condition can be determined by a heating condition determining means at step S33 of FIG. 3 when the air outlet mode is one of the foot mode in which conditioned air is blown from a foot air outlet at least on the driver's seat side, and a bi-level mode in which conditioned air is blown from both the foot air outlet and the face air outlet at least on the driver's seat side.

Even in this case, the heating condition can be accurately determined.

(5) In the above-described second embodiment, the air conditioning unit capable of setting the inside/outside air two-layer mode is used. However, the air conditioning unit capable of setting the inside/outside air two-layer mode may be partially or entirely combined with the structure of the third embodiment (FIGS. 10 to 12). In the inside/outside air two-layer mode, inside air having relatively high temperature flows toward a lower side (foot area) of the front-passenger's seat side while outside air having relatively low temperature flows toward an upper side (ceiling side) of the front-passenger's seat side.

Thus, in the third embodiment, door mechanisms (24, 34, 35) may be provided to independently open and close the face air outlets 31a, 31b on the front-passenger's seat side and the defroster air outlets 20a, 20b in the air conditioning unit 1.

Even in the vehicle air conditioner with the inside/outside air two-layer mode, when the one-seat priority switch 65 is turned on and the heating condition is determined, the air amount blown from the face air outlets 31a, 31b on the front-passenger's seat side and from the defroster air outlets 20a, 20b may be set at zero or may be reduced by using the doors 24, 34, 35. The operation positions of the doors 24, 34, 35 are adjusted by servomotors 28, 38, 39 based on signals from the air conditioning ECU 10.

In this case, it can prevent outside cool air from being blown toward the ceiling portion (upper side) in the vehicle compartment from the face air outlets 31a, 31b on the front-passenger's seat side and from the defroster air outlets 20a, 20b. The air blown from the face air outlets 31a, 31b on the front-passenger's seat side and the defroster air outlets 20a, 20b may be manually stopped or door open degrees of the doors 24, 34, 35 may be adjusted by using a control wire or the like.

(6) As a heating target value in the heating operation, the door open degree SW of the temperature adjustment door (air mixing door), the target air temperature TAO or the open degree of the flow adjustment valve may be used. When a temperature sensor is provided in an air outlet, the heating target value may be used as the target air temperature TAO in the one-seat priority mode control.

Figure 23:
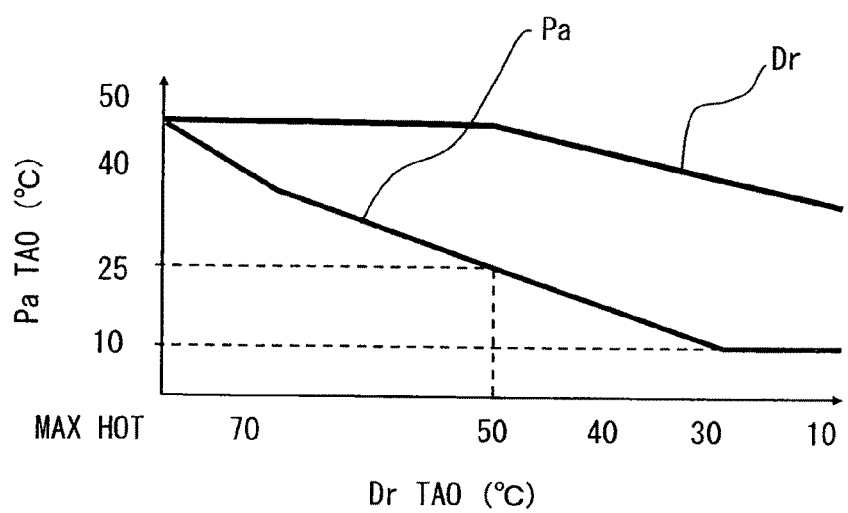
FIG. 23 is a control map adapted to a one-seat priority mode control of an air conditioning ECU according to the other embodiment of the present embodiment.

(7) Another example will be described with reference to FIG. 23. FIG. 23 is control map used in the one-seat priority mode control, showing the relationship between the driver's seat target air temperature DrTAO and the front-passenger's seat target air temperature PaTAO. In the above-described fifth embodiment, the air temperature to be blown into the vehicle compartment is controlled based on the driver's seat target air temperature DrTAO. However, as shown in FIG. 23, the target air temperature DrTAO on the driver's seat side is calculated in first, and then the target air temperature PaTAO on the front-passenger's seat side may be calculated by using the target air temperature DrTAO on the driver's seat side based on the control map shown in FIG. 23.

Because the driver's seat target air temperature DrTAO is controlled by using control factors such as the set temperature, the solar radiation amount, the outside air temperature, the inside air temperature and the like, the one-seat priority mode control can be performed by changing the target air temperature PaTAO on the front-passenger's seat side by using the plural control factors.

Figure 24:
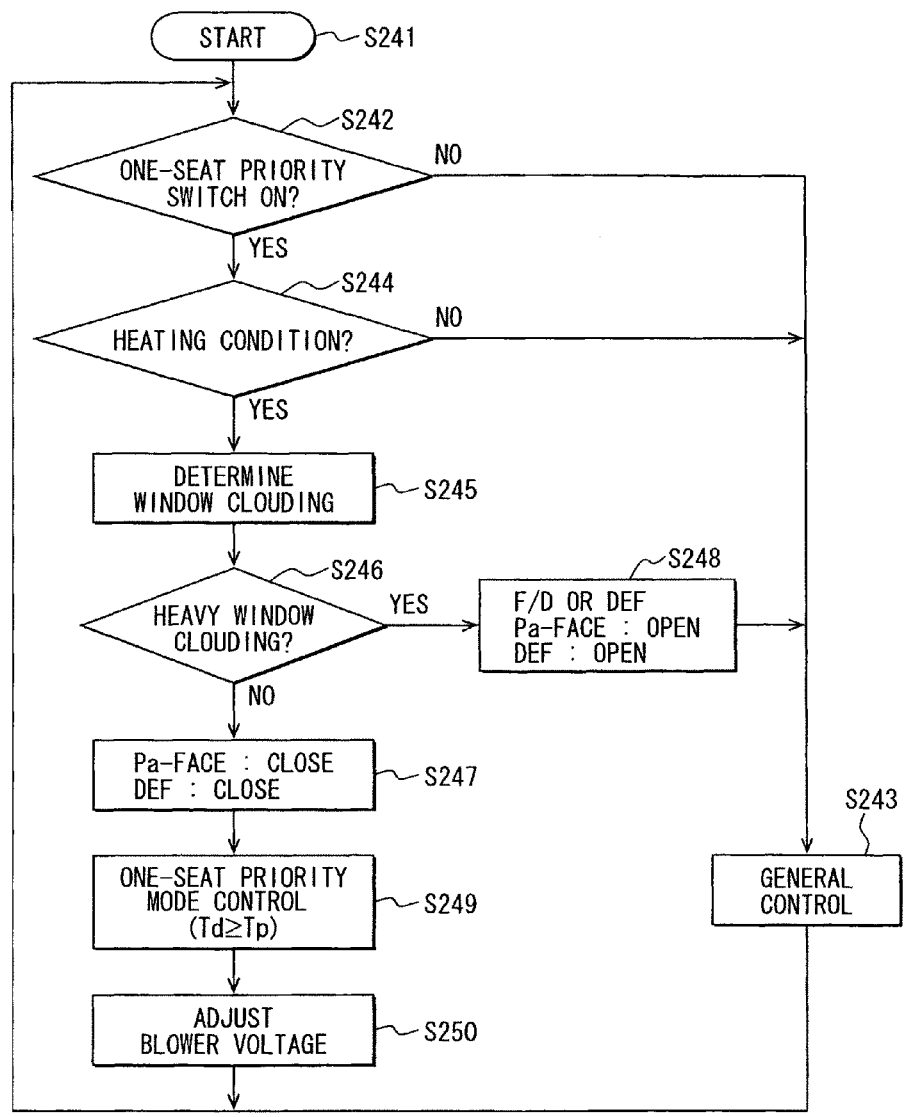
FIG. 24 is a flow diagram showing a control example of an air conditioning ECU according to the other embodiment of the present embodiment.

(8) FIG. 24 is a flow diagram showing a control example of the air conditioning ECU 10 according to another example of the present invention. In FIG. 24, when the control of step S241 starts, it is determined whether the one-seat priority switch 65 of FIG. 2 is turned ON at step S242.

When the one-seat priority switch 65 is not turned ON, a general control is performed at step S243. In contrast, when the one-seat priority switch 65 is turned on, it is determined whether a heating condition is satisfied at step S244.

It is determined that the heating condition is satisfied, when the outside air temperature is lower than a predetermined temperature (e.g., 20° C.) and when the target air temperature (TAO) to be blown into the vehicle compartment is higher than a predetermined temperature (e.g., 25° C.).

In the present embodiment, in a case where a vehicle air conditioner is configured to switch an air outlet mode at least on the driver's seat side, the heating condition may be determined to be satisfied when the air outlet mode is a foot mode or a bi-level mode at a time before the one-seat priority switch 65 is turned on, in addition to the above two conditions.

When it is determined that the heating condition is not satisfied at step S244, the general control is performed at step S243. When it is determined that the heating condition is satisfied at step S244, a window clouding is determined at step S245 (window clouding calculating means).

For example, at step S244, the air conditioning ECU 10 calculates a window glass temperature by applying an output value of the window temperature sensor 49 into a predetermined computing equation memorized in advance, and a window-glass surface relative humidity RHW is calculated based on the relative humidity RH and the window glass temperature.

That is, the window surface relative humidity RHW is calculated by using a psychometric chart based on the relative humidity RH, the air temperature, and the window glass temperature. Furthermore, when the window surface relative humidity RHW exceeds a predetermined standard value, a window clouding state signal is output.

At step S246 of FIG. 24, when a heavy window clouding state (danger state) is determined based on the outputted window clouding state signal, a foot/defroster mode (F/D) or a defroster mode (DEF) is set as the air outlet mode, and all the front-passenger's seat face air outlets 31a, 31b and the defroster air outlets 20a, 20b are opened or almost of those are opened. Then, the general control at step S243 is performed after step S248 is performed.

On the other hand, at step S246 of FIG. 24, when the window clouding state signal is not outputted, it is determined that there is no window clouding, and thereby all the front-passenger's seat face air outlets 31a, 31b and the defroster air outlets 20a, 20b (see FIG. 11) are closed or almost of those are closed at step S247.

After step S257 is performed, the one-seat priority mode control is performed such that the air temperature Td to be blown to the driver's seat space is equal to or higher than the air temperature Tp to be blown to the front-passenger's seat space (Td≥Tp), at step S249.

When the window clouding is determined at step S248 of FIG. 24, the foot/defroster air outlet mode (F/D mode) may be set for the driver's seat side so that conditioned air is blown from both the foot air outlet and the defroster air outlet, or the defroster mode (DEF mode) may be set for the driver's seat side so that conditioned air is blown from the defroster air outlet. Furthermore, at step S248, the face air outlet for the front-passenger's seat side and the defroster air outlet are opened, and then the general control is performed at step S243. Thus, it is possible to prevent a reduce in the air temperature to be blown toward the front-passenger's seat side in the vehicle compartment. Thereby, it is possible to prevent cool air from being blown from the face air outlet on the front passenger's seat side or the defroster air outlet in the one-seat priority mode control.

In the example of FIG. 24, after the step S249 is performed, a blower correction is performed at step S250 so that the air blowing amount to be blown toward the driver's seat side in the one-seat priority mode control is the same as the air blowing amount to be blown toward the driver's seat side in the general control. For example, a correction amount of the blower correction may be determined based on the difference between the operation positions of the temperature adjustment doors (air mixing doors) on the driver's seat side and the front-passenger's seat side.

The correction amount of the blower may be set so that the voltage applied to the blower may be increased, or an electrical pulse width may be enlarged by a predetermined amount.

Alternatively, the air blowing amount may be corrected in accordance with determined air outlet on the driver's seat side and the front-passenger's seat side based on a stored correction formula.

In the above-described third embodiment, as the window clouding determining means, the humidity detection sensor 76 of the front window 49a of the vehicle compartment is used. Furthermore, the air conditioning ECU 10 calculates the relative humidity RH of air in the vehicle compartment near the front windshield, based on a value output from the humidity sensor portion 47.

That is, the air conditioning ECU 10 memorizes a predetermined computing equation in advance, and the relative humidity RH is calculated by using the output value of the humidity sensor portion 47 based on the predetermined computing equation.

Then, the air conditioning ECU 10 calculates the window glass temperature by applying an output value of the window temperature sensor 49 into a predetermined computing equation memorized in advance. Further, the window surface relative humidity RHW is calculated based on the calculated relative humidity RH and the window glass temperature.

As described above, the window clouding state may be determined by using the humidity sensor. However, the window clouding state may be determined by using at least one of the solar radiation amount, the outside air temperature, the inside air temperature, the vehicle speed, the calculated target air temperature, the blower air amount and the determined air outlet mode, for example.

Figure 25:
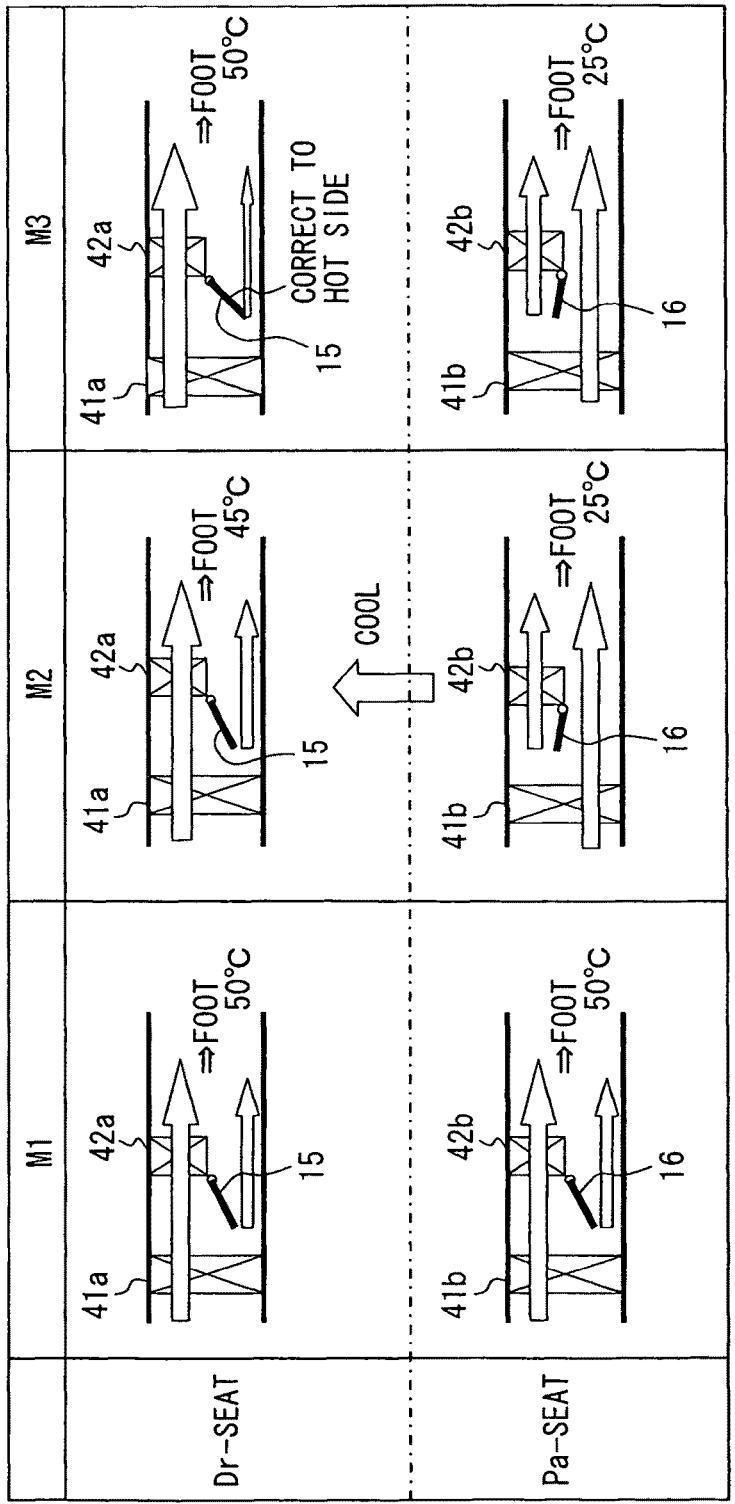
FIG. 25 is a schematic diagram showing operation of air temperature adjustment mechanisms on a driver's seat side and a front-passenger's seat side in a control mode (M3) of the other embodiment, in a control mode (M1) of a comparative example and in a control mode (M2) of the first embodiment of the present invention.

(9) FIG. 25 is a schematic diagram showing operation of an air temperature adjustment mechanism on a driver's seat side (Dr) and a front-passenger's seat side (Pa) in a control mode M1 of a comparative example and in a control mode M2 of the first embodiment of the present invention, in a control mode M3 of the other embodiment of the present invention.

In FIG. 25, a cooling heat exchanger 41a on the driver's seat side, a heating heat exchanger 42a on the driver's seat side, a cooling heat exchanger 41b on the front-passenger's seat side, and a heating heat exchanger 42b on the front-passenger's seat side are provided. Furthermore, a temperature adjustment door 15 on the driver's seat side and a temperature adjustment door 16 on the front-passenger's seat side are provided to independently control the temperature of air to be blown toward the driver's seat side and the temperature of air to be blown toward the front-passenger's seat side in the vehicle compartment.

In the control mode M1 of the comparative example (general control), the air temperature to be blown into the foot air outlet on the driver's seat side may be 50° C., and the air temperature to be blown into the foot air outlet on the front-passenger's seat side may be 50° C., for example. In this case, when the control mode is changed from the control mode M1 to the control mode M2, the air temperature blown toward the driver's seat side may be decreased due to air blown toward the front-passenger's seat side.

For example, as shown in the control mode M2, due to the air temperature blown toward the front-passenger's seat side, the air temperature to be blown toward the driver's seat side in the vehicle compartment is reduced to 45° C. from 50° C. in the one-seat priority mode control.

With respect to the control mode M2, in the control mode M3 of the other embodiment of the present invention, the temperature adjustment door (air mixing door) 15 on the driver's seat side is corrected in the one-seat priority mode control so that the air temperature is increased to that of the general control M1. By the correction of the temperature adjustment door 15 on the hot side, the air temperature to be blown toward the driver's seat side can be increased by a predetermined amount, in the one-seat priority mode control.

Figure 26:
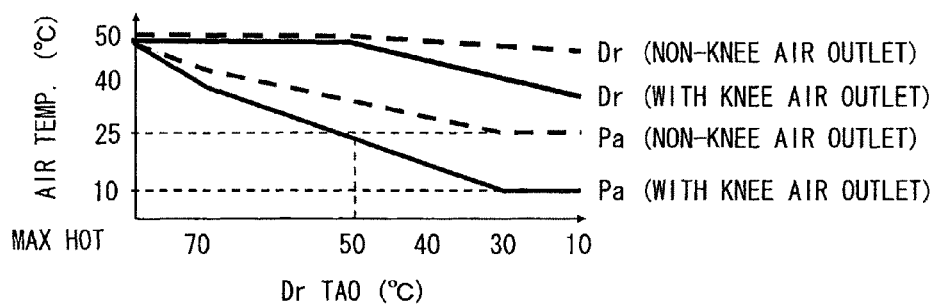
FIG. 26 is a control map adapted to a vehicle air conditioner provided with an opening/closing mechanism for opening and closing a knee air outlet from which conditioned air is blown toward the knee portion of a passenger in a vehicle compartment, according to the other embodiment.

(10) FIG. 26 is a control map adapted to a vehicle air conditioner provided with an opening/closing mechanism for opening and closing the air outlet 27 (see FIG. 1) from which conditioned air is blown toward the knees of the driver in the vehicle compartment, according to the other embodiment.

In FIG. 1, the driver's seat knee air outlet 27 is provided to blow air toward the knees of the driver, in addition to the driver's seat foot air outlet 23a.

In this case, the control graph may be changed from the solid line graph to the chain line graph at least at one side of the front-passenger's seat side (Pa) and the driver's seat side (Dr). In this case, it can prevent the temperature feeling from being deteriorated in the one-seat priority mode.

(11) A vehicle air conditioner may be provided with a switch means for selectively switching a pleasant mode, a general mode, an economy mode or the like. For example, in an electric vehicle, a general control for performing a pleasant air-conditioning control or an economy control which can save battery electric power than the general control is usually performed in the air-conditioning control, in order to save the battery.

Figure 27:
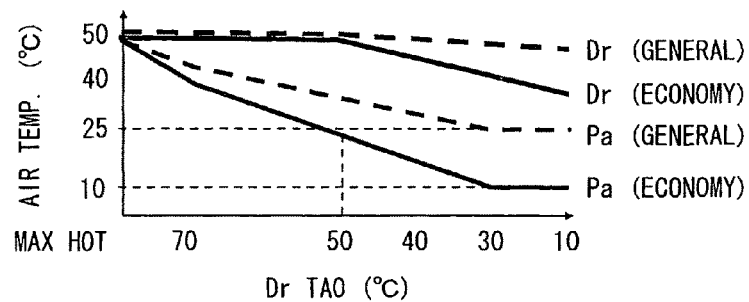
FIG. 27 is a control map adapted to a vehicle air conditioner which can be switched to an economy mode based on a target temperature of conditioned air to be blown to a driver's seat side in a vehicle compartment.

Thus, when the economy control is selected, the air temperature to be blown toward at least one of the driver's seat side and the front-passenger's seat side may be reduced in accordance with a rank decrease of the control mode, as shown in FIG. 27, for example.

FIG. 27 is a control map adapted to a vehicle air conditioner which can be switched to an economy mode based on a target temperature (DrTAO) of conditioned air to be blown to a driver's seat side in the vehicle compartment. As shown in FIG. 27, when a switch is manually operated by an occupant from the general control to the economy control, the air temperature control graph is reduced at least one of the driver's seat side and the front-passenger's seat side, from the chain line control to the solid line control.

(12) In an air conditioner for electrical vehicle (EV) capable of performing left and right independent controls, electrical heaters may be respectively used for the driver's seat side and the front-passenger's seat side.

In this case, in the one-seat priority mode control, the electrical heater on the front passenger's seat side may be stopped or electrical power consumed in the electrical heater on the front-passenger's seat side may be reduced, thereby reducing electrical power consumed in the entire air conditioning.

(13) When the one-seat priority mode control is released during the control of the one-seat priority mode control, air blown toward the front-passenger's seat side of the vehicle compartment may be stopped for few minutes or an air amount blown toward the front-passenger's seat side of the vehicle compartment may be reduced. In this case, initial cooling on the front-passenger's seat side can be restricted. Furthermore, a seat sensor may be provided to determine whether an occupant is seated on the front-passenger's seat.

(14) In the above-described embodiments, the air temperature to be blown toward the front-passenger's seat side is made lower than the air temperature to be blown toward the driver's seat side in the vehicle compartment. In this case, immediately after the front-passenger rides on the front-passenger's seat, the front-passenger may feel cool due to the one-seat priority mode control.

Thus, the temperature adjustment door 16 (air mixing door) on the front-passenger's seat side may be forcibly moved to a hot side for a predetermined time after the front-passenger rides on the front-passenger's seat. In this case, thermal feeling for the front-passenger can be improved.

Such changes and modifications are to be understood as being within the scope of the present invention as defined by the appended claims.

What is claimed is:

1. An air conditioner for a vehicle, the air conditioner comprising:
    an air conditioning unit that includes a heating heat exchanger configured to heat air to be blown into a vehicle compartment, a first temperature adjustment mechanism configured to adjust a temperature of air to be blown toward a driver's seat side in the vehicle compartment, and a second temperature adjustment mechanism configured to adjust a temperature of air to be blown toward a front-passenger's seat side in the vehicle compartment;
    an occupant determining part that determines whether only a driver is on a driver seat as an occupant in the vehicle compartment;
    a mode determining part that determines whether an air conditioning state on the driver's seat side is a heating condition; and
    a controller including the first and second temperature adjustment mechanisms to perform a one-seat priority mode control in which the temperature of air to be blown toward the front-passenger's seat side is lower than the temperature of air to be blown toward the driver's seat side, when the occupant determining part determines that only the driver is in the vehicle compartment and the heating condition is determined as the air conditioning state, wherein
    the second temperature adjustment mechanism includes an upper-side temperature adjustment portion configured to adjust the temperature of air blown toward an upper side of the front-passenger's seat, and a lower-side temperature adjustment portion configured to adjust the temperature of air blown toward a lower side of the front-passenger's seat, and
    in the one-seat priority mode control in which the temperature of air to be blown toward the front-passenger's seat side is made lower than the temperature of air to be blown toward the driver's seat side, the controller controls the lower-side temperature adjustment portion to be cooler, as compared with the upper-side temperature adjustment portion.

2. The air conditioner according to claim 1, wherein
    the air conditioning unit is provided with a face air outlet from which conditioned air is blown toward an upper side of the front-passenger's seat side in the vehicle compartment,
    the controller causes the face air outlet to be closed in the one-seat priority mode control in which the temperature of air to be blown toward the front-passenger's seat side is made lower than the temperature of air to be blown toward the driver's seat side.

* * * * *